US012717739B2

(12) United States Patent
Inoue et al.

(10) Patent No.: US 12,717,739 B2
(45) Date of Patent: Aug. 25, 2026

(54) MEMORY SYSTEM AND METHOD OF OPERATING CONTROLLER

(71) Applicant: Kioxia Corporation, Tokyo (JP)

(72) Inventors: Koichi Inoue, Yokohama (JP); Sachiyo Miyamoto, Yokohama (JP); Minoru Uchida, Yokohama (JP); Taro Iwashiro, Yokohama (JP); Kenji Sakaue, Yokohama (JP)

(73) Assignee: KIOXIA CORPORATION, Tokyo (JP)

( * ) Notice: Subject to any disclaimer, the term of this patent is extended or adjusted under 35 U.S.C. 154(b) by 51 days.

(21) Appl. No.: 18/458,249

(22) Filed: Aug. 30, 2023

(65) Prior Publication Data

US 2024/0143531 A1 May 2, 2024

(30) Foreign Application Priority Data

Oct. 26, 2022 (JP) ................................ 2022-171756

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS 6,789,172 B2 * 9/2004 Chauvel .............. G06F 12/0835 710/22
7,430,634 B2 9/2008 Matsuda et al.
8,010,736 B2 8/2011 Park et al.
8,255,591 B2 * 8/2012 Bohrer .................... G06F 13/28 710/22
8,433,829 B2 4/2013 Kwon et al.
10,095,643 B2 * 10/2018 Becker ................ G06F 13/4068
10,649,898 B2 * 5/2020 Kim .................... G06F 13/1673
11,487,695 B1 * 11/2022 Radhakrishnan ... G06F 13/1626
12,292,845 B2 * 5/2025 Wen ........................ G06F 13/28
2005/0091383 A1 * 4/2005 Bender ............... H04L 67/1097 709/228
2006/0129707 A1 6/2006 Matsuda et al.
2013/0117766 A1 * 5/2013 Bax ....................... G06F 9/4401 719/323
2014/0201402 A1 * 7/2014 Dalal ................. G06F 12/0815 710/107

(Continued)

*Primary Examiner* — Henry Tsai
*Assistant Examiner* — Christopher A Bartels
(74) *Attorney, Agent, or Firm* — Foley & Lardner LLP

(57) ABSTRACT

A memory system includes a nonvolatile memory and a memory controller including a bus, a cache memory, a direct memory access controller, a first search circuit, a second search circuit, and a transfer control circuit. The direct memory access controller transfers cache target data stored in the nonvolatile memory to the cache memory. The second search circuit searches the cache target data that is being transferred. The transfer control circuit assigns, in response to the second search circuit detecting a search hit, to the transfer control circuit and the second search circuit, a bus right which has been assigned at least to the cache memory for the transfer of the cache target data to the cache memory, and obtains, by using the assigned bus right, a search result from the second search circuit via the bus.

23 Claims, 19 Drawing Sheets

(56) References Cited

U.S. PATENT DOCUMENTS

| | | | | |
|---|---|---|---|---|
| 2015/0242324 | A1* | 8/2015 | Novakovic | G06F 12/0813 711/121 |
| 2018/0052803 | A1* | 2/2018 | Graham | H04L 49/355 |
| 2018/0063016 | A1* | 3/2018 | Gulati | G06F 9/546 |
| 2018/0293101 | A1* | 10/2018 | Park | G06F 9/546 |
| 2018/0365176 | A1* | 12/2018 | Finkelstein | H04L 47/34 |
| 2019/0034381 | A1* | 1/2019 | Burstein | H04L 67/1097 |
| 2019/0347125 | A1* | 11/2019 | Sankaran | G06F 9/30181 |
| 2020/0125529 | A1* | 4/2020 | Byers | G06F 13/28 |
| 2022/0345417 | A1* | 10/2022 | Kasichainula | H04L 47/30 |
| 2023/0012707 | A1* | 1/2023 | Shetty | G06F 13/1626 |
| 2023/0138215 | A1* | 5/2023 | Hiwada | G06F 3/0604 711/103 |
| 2023/0205460 | A1* | 6/2023 | Ishihara | G06F 12/0238 711/154 |
| 2024/0015109 | A1* | 1/2024 | Markovitz | H04L 49/901 |
| 2024/0320174 | A1* | 9/2024 | Pedersen | G06F 13/28 |

* cited by examiner

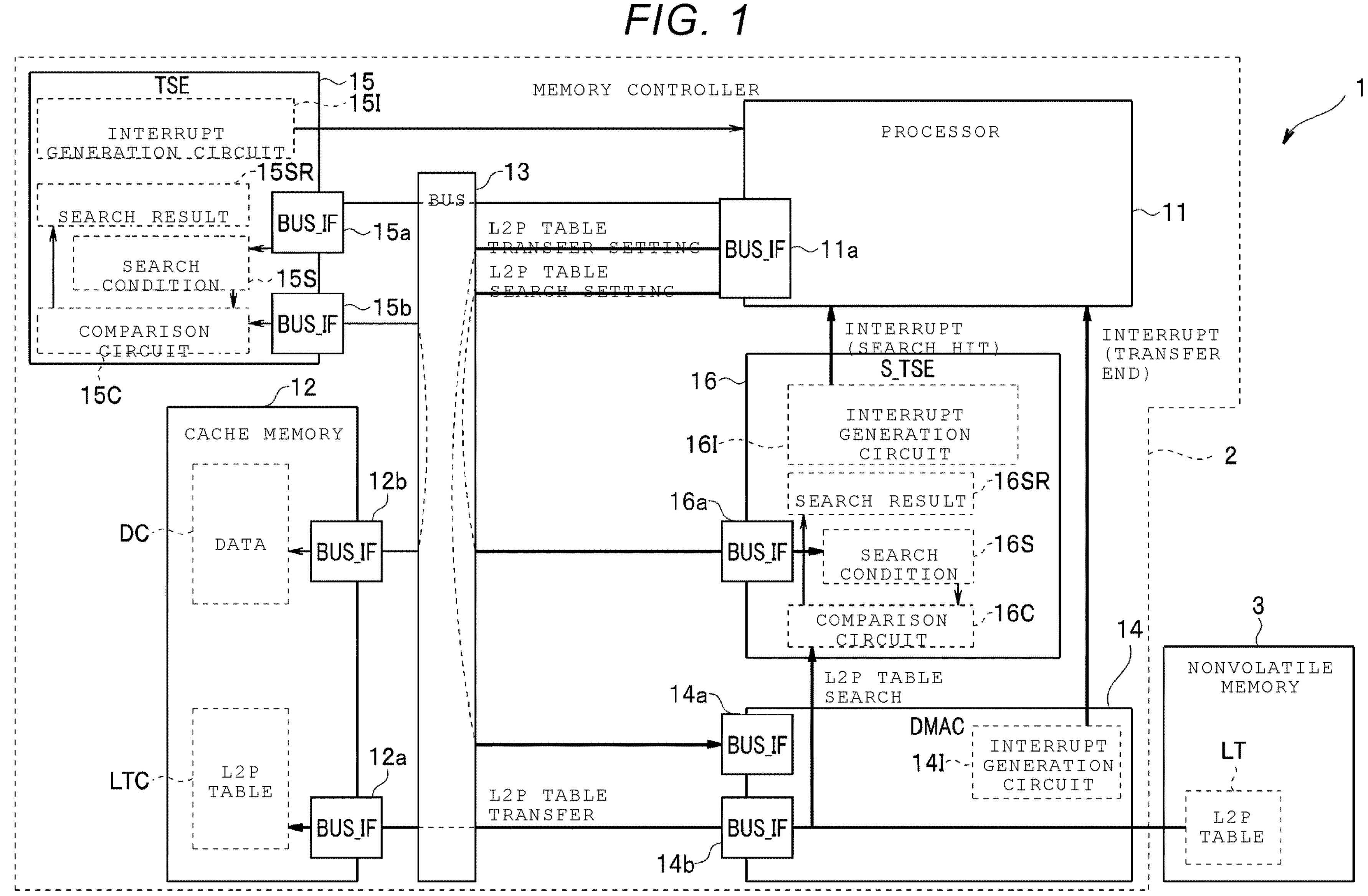
FIG. 1
1
MEMORY CONTROLLER
TSE
15
15I
INTERRUPT GENERATION CIRCUIT
15SR
SEARCH RESULT
SEARCH CONDITION
15S
COMPARISON CIRCUIT
15C
BUS_IF
15a
15b
BUS
13
L2P TABLE TRANSFER SETTING
L2P TABLE SEARCH SETTING
PROCESSOR
11
11a
INTERRUPT (SEARCH HIT)
INTERRUPT (TRANSFER END)
2
12
CACHE MEMORY
DC
DATA
12b
LTC
L2P TABLE
12a
16
S_TSE
16I
INTERRUPT GENERATION CIRCUIT
16SR
SEARCH RESULT
16a
16S
SEARCH CONDITION
16C
COMPARISON CIRCUIT
L2P TABLE SEARCH
14
14a
DMAC
14I
INTERRUPT GENERATION CIRCUIT
L2P TABLE TRANSFER
14b
3
NONVOLATILE MEMORY
LT
L2P TABLE

FIG. 2

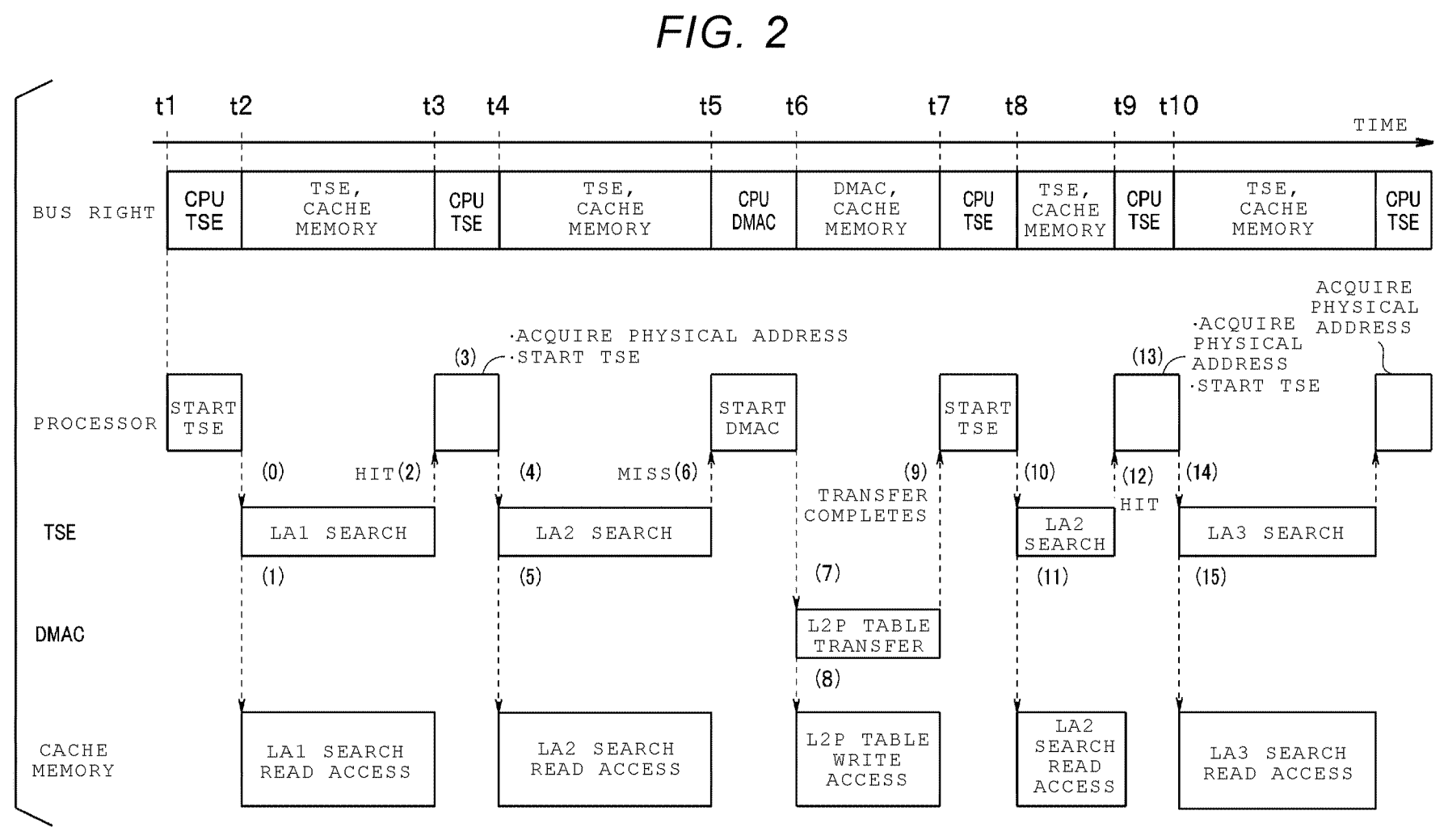

BUS RIGHT
PROCESSOR
TSE
DMAC
CACHE MEMORY

TIME
t1 t2 t3 t4 t5 t6 t7 t8 t9 t10

CPU TSE
TSE, CACHE MEMORY
CPU TSE
TSE, CACHE MEMORY
CPU DMAC
DMAC, CACHE MEMORY
CPU TSE
TSE, CACHE MEMORY
CPU TSE
TSE, CACHE MEMORY
CPU TSE

START TSE
(0)
LA1 SEARCH
(1)
LA1 SEARCH READ ACCESS
HIT(2)
(3)
·ACQUIRE PHYSICAL ADDRESS
·START TSE
(4)
LA2 SEARCH
(5)
LA2 SEARCH READ ACCESS
MISS(6)
START DMAC
(7)
L2P TABLE TRANSFER
(8)
L2P TABLE WRITE ACCESS
(9)
TRANSFER COMPLETES
START TSE
(10)
LA2 SEARCH
(11)
LA2 SEARCH READ ACCESS
(12)
HIT
(13)
·ACQUIRE PHYSICAL ADDRESS
·START TSE
(14)
LA3 SEARCH
(15)
LA3 SEARCH READ ACCESS
ACQUIRE PHYSICAL ADDRESS

FIG. 3

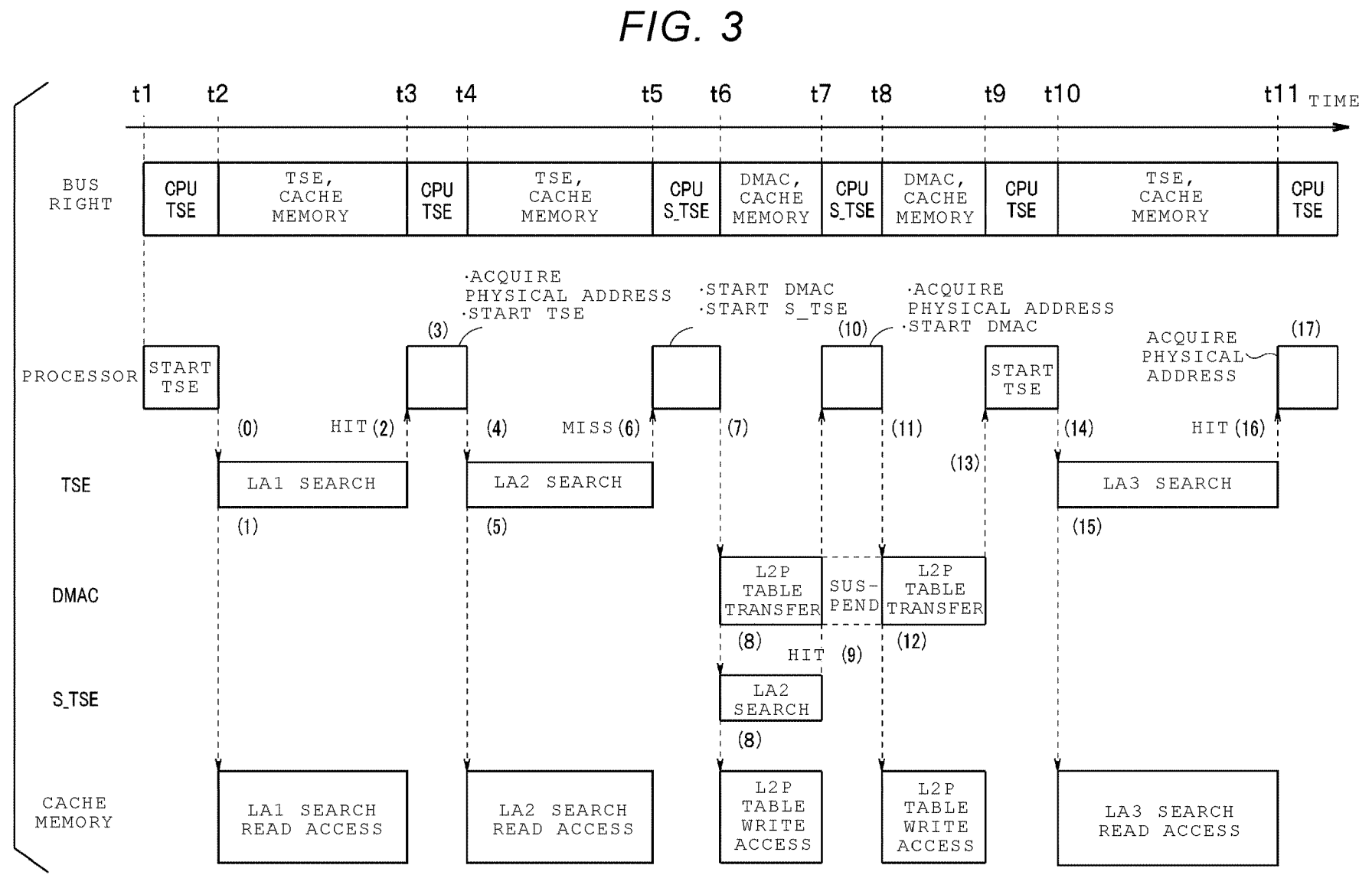

BUS RIGHT
PROCESSOR
TSE
DMAC
S_TSE
CACHE MEMORY

TIME
t1 t2 t3 t4 t5 t6 t7 t8 t9 t10 t11

CPU TSE
TSE, CACHE MEMORY
CPU TSE
TSE, CACHE MEMORY
CPU S_TSE
DMAC, CACHE MEMORY
CPU S_TSE
DMAC, CACHE MEMORY
CPU TSE
TSE, CACHE MEMORY
CPU TSE

START TSE
(0)
LA1 SEARCH
(1)
LA1 SEARCH READ ACCESS
HIT (2)
(3)
·ACQUIRE PHYSICAL ADDRESS
·START TSE
(4)
LA2 SEARCH
(5)
LA2 SEARCH READ ACCESS
MISS (6)
·START DMAC
·START S_TSE
(7)
L2P TABLE TRANSFER
(8)
LA2 SEARCH
(8)
L2P TABLE WRITE ACCESS
HIT (9)
SUS-PEND
(10)
·ACQUIRE PHYSICAL ADDRESS
·START DMAC
(11)
L2P TABLE TRANSFER
(12)
L2P TABLE WRITE ACCESS
(13)
START TSE
(14)
LA3 SEARCH
(15)
LA3 SEARCH READ ACCESS
HIT (16)
ACQUIRE PHYSICAL ADDRESS
(17)

Figure 5:
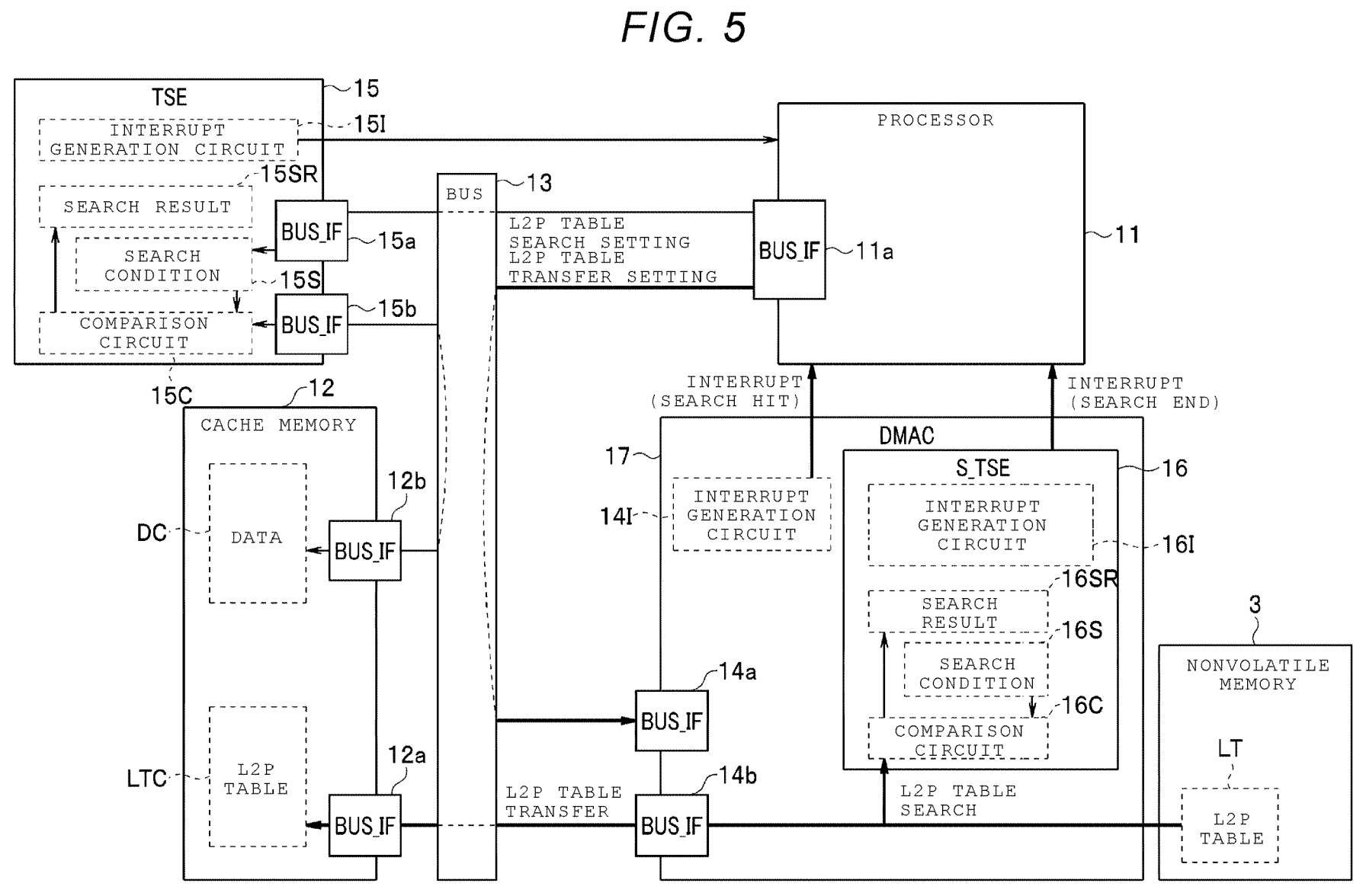

PROCESSOR
11
BUS_IF
11a
INTERRUPT (SEARCH END)
INTERRUPT (SEARCH HIT)
16
16I
DMAC
S_TSE
INTERRUPT GENERATION CIRCUIT
16SR
SEARCH RESULT
16S
SEARCH CONDITION
16C
COMPARISON CIRCUIT
L2P TABLE SEARCH
3
NONVOLATILE MEMORY
LT
L2P TABLE
INTERRUPT GENERATION CIRCUIT
17
14I
14a
BUS_IF
14b
BUS_IF
L2P TABLE TRANSFER
L2P TABLE SEARCH SETTING
L2P TABLE TRANSFER SETTING
13
BUS
15
15I
TSE
INTERRUPT GENERATION CIRCUIT
15a
BUS_IF
15b
BUS_IF
15SR
SEARCH RESULT
15S
SEARCH CONDITION
COMPARISON CIRCUIT
15C
12
CACHE MEMORY
12b
BUS_IF
12a
BUS_IF
DATA
DC
L2P TABLE
LTC

FIG. 6

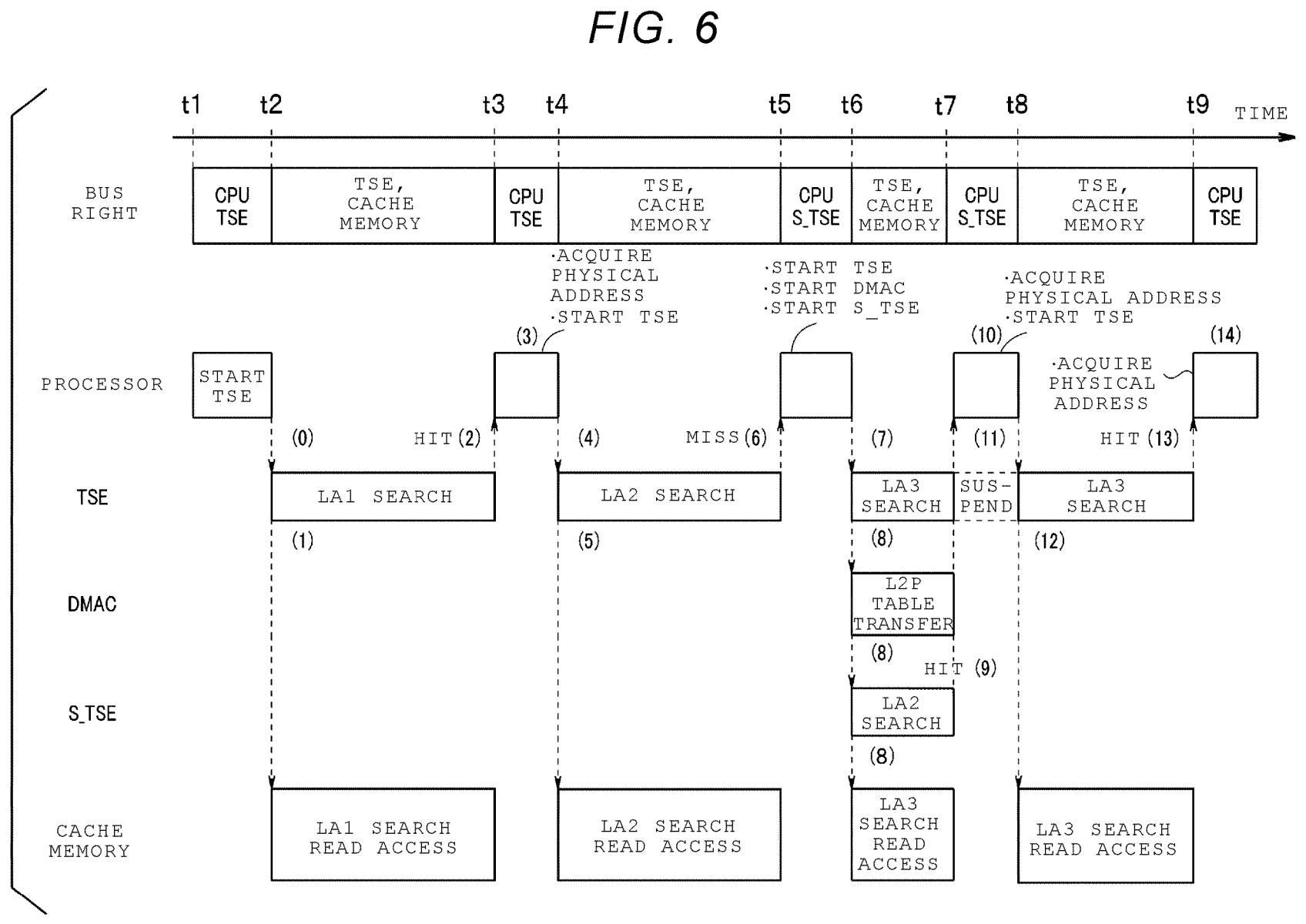

BUS RIGHT
PROCESSOR
TSE
DMAC
S_TSE
CACHE MEMORY
TIME
t1 t2 t3 t4 t5 t6 t7 t8 t9
CPU TSE
TSE, CACHE MEMORY
CPU TSE
TSE, CACHE MEMORY
CPU S_TSE
TSE, CACHE MEMORY
CPU S_TSE
TSE, CACHE MEMORY
CPU TSE
START TSE
(3) ·ACQUIRE PHYSICAL ADDRESS ·START TSE
·START TSE ·START DMAC ·START S_TSE
(10) ·ACQUIRE PHYSICAL ADDRESS ·START TSE
(14) ·ACQUIRE PHYSICAL ADDRESS
(0) LA1 SEARCH HIT (2)
(4) LA2 SEARCH MISS (6)
(7) LA3 SEARCH
(11) SUS-PEND
LA3 SEARCH HIT (13)
(1) (5) (8) (8) (8) (12)
L2P TABLE TRANSFER
LA2 SEARCH HIT (9)
LA1 SEARCH READ ACCESS
LA2 SEARCH READ ACCESS
LA3 SEARCH READ ACCESS
LA3 SEARCH READ ACCESS

Figure 9:
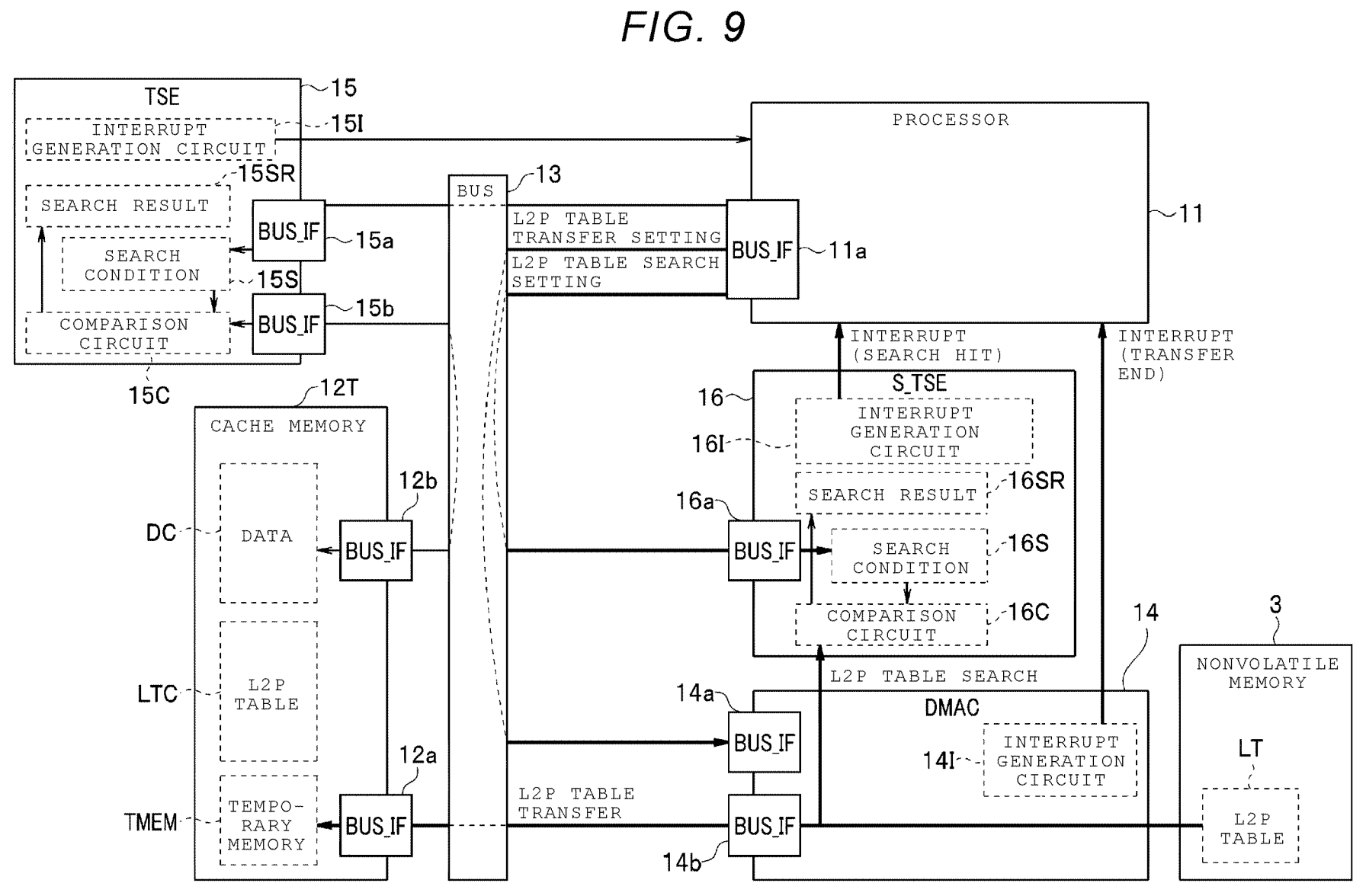

PROCESSOR
11
11a BUS_IF
INTERRUPT (TRANSFER END)
INTERRUPT (SEARCH HIT)
NONVOLATILE MEMORY
3
LT L2P TABLE
14 DMAC
14I INTERRUPT GENERATION CIRCUIT
14a BUS_IF
14b BUS_IF
L2P TABLE SEARCH
L2P TABLE TRANSFER
16 S_TSE
16I INTERRUPT GENERATION CIRCUIT
16SR SEARCH RESULT
16S SEARCH CONDITION
16C COMPARISON CIRCUIT
16a BUS_IF
13 BUS
L2P TABLE TRANSFER SETTING
L2P TABLE SEARCH SETTING
15 TSE
15I INTERRUPT GENERATION CIRCUIT
15SR SEARCH RESULT
15S SEARCH CONDITION
15C COMPARISON CIRCUIT
15a BUS_IF
15b BUS_IF
12T CACHE MEMORY
12a BUS_IF
12b BUS_IF
DC DATA
LTC L2P TABLE
TMEM TEMPO-RARY MEMORY

FIG. 10

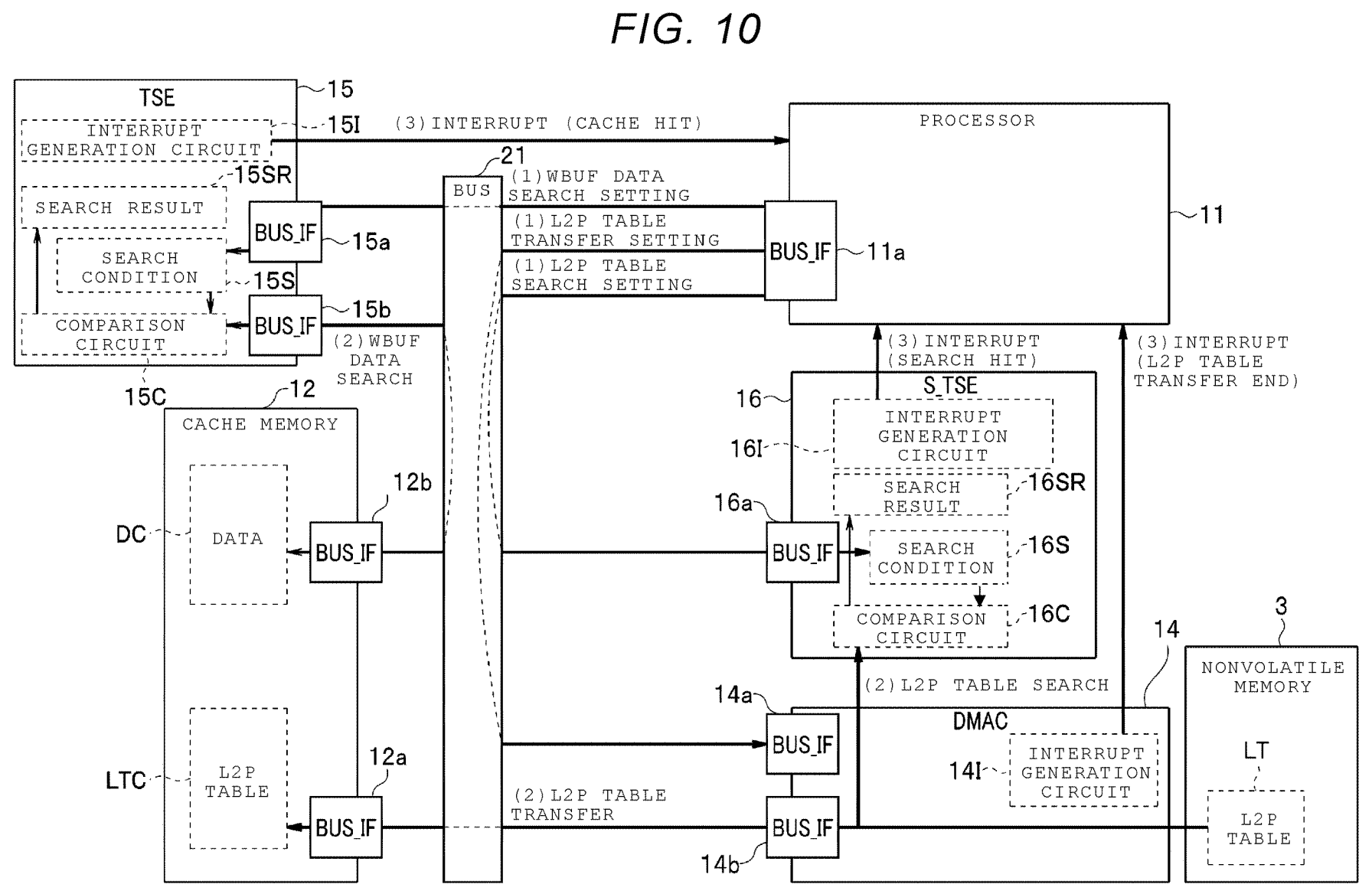

PROCESSOR
11
11a
BUS_IF
(3) INTERRUPT (L2P TABLE TRANSFER END)
(3) INTERRUPT (SEARCH HIT)
(3) INTERRUPT (CACHE HIT)
(1) WBUF DATA SEARCH SETTING
(1) L2P TABLE TRANSFER SETTING
(1) L2P TABLE SEARCH SETTING
S_TSE
INTERRUPT GENERATION CIRCUIT
SEARCH RESULT
SEARCH CONDITION
COMPARISON CIRCUIT
16SR
16S
16C
16
16I
16a
BUS_IF
(2) L2P TABLE SEARCH
DMAC
INTERRUPT GENERATION CIRCUIT
14I
14
14a
14b
BUS_IF
BUS_IF
NONVOLATILE MEMORY
3
LT
L2P TABLE
21
BUS
(2) L2P TABLE TRANSFER
(2) WBUF DATA SEARCH
12b
12a
BUS_IF
BUS_IF
CACHE MEMORY
12
DATA
L2P TABLE
DC
LTC
TSE
15
15I
INTERRUPT GENERATION CIRCUIT
15SR
SEARCH RESULT
15S
SEARCH CONDITION
COMPARISON CIRCUIT
15C
15a
15b
BUS_IF
BUS_IF

FIG. 12

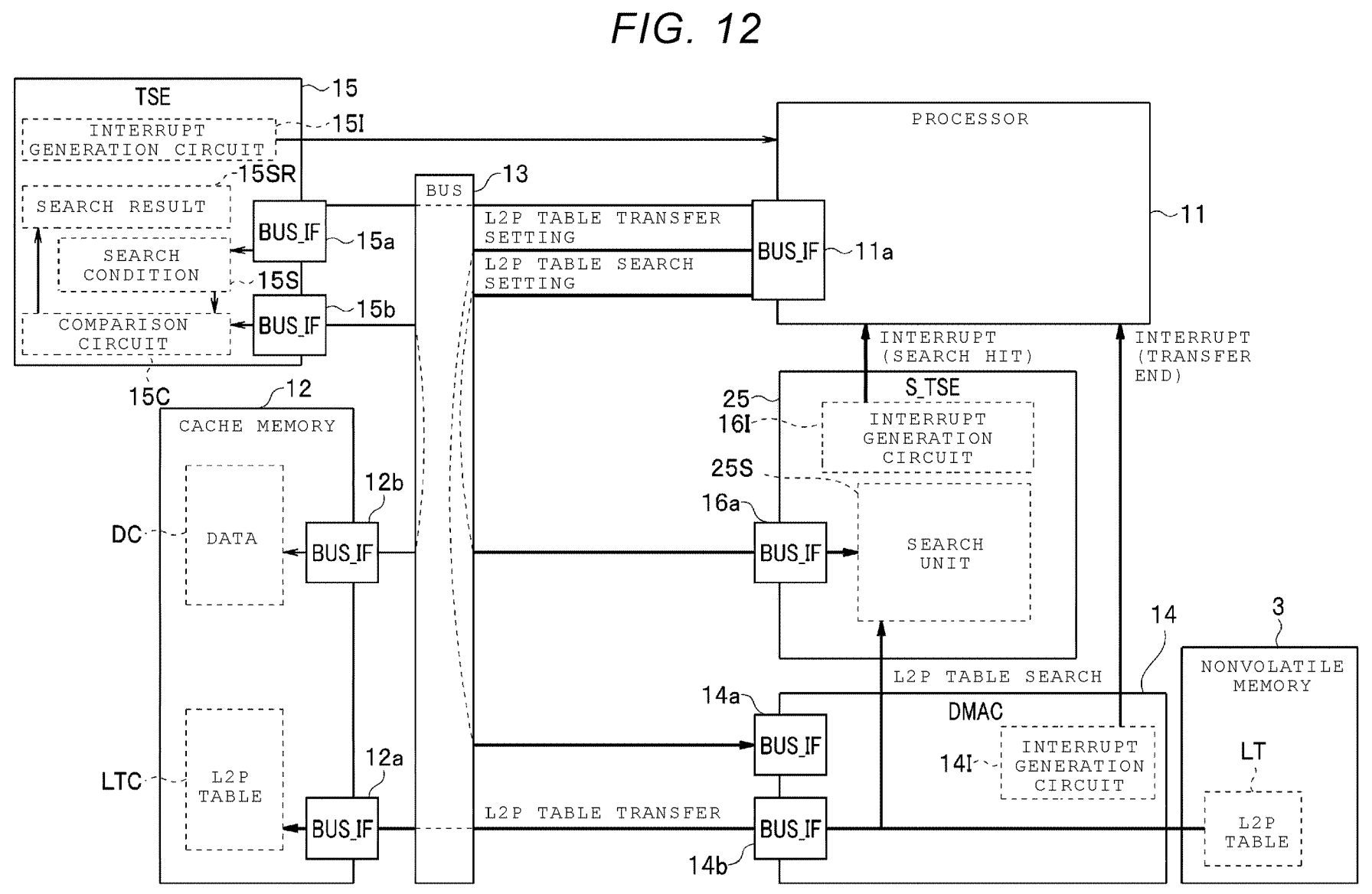

PROCESSOR
11
11a
BUS_IF
INTERRUPT (TRANSFER END)
INTERRUPT (SEARCH HIT)
S_TSE
INTERRUPT GENERATION CIRCUIT
SEARCH UNIT
BUS_IF
25
16I
25S
16a
L2P TABLE SEARCH
DMAC
14
INTERRUPT GENERATION CIRCUIT
14I
BUS_IF
BUS_IF
14a
14b
3
NONVOLATILE MEMORY
LT
L2P TABLE
L2P TABLE TRANSFER SETTING
L2P TABLE SEARCH SETTING
L2P TABLE TRANSFER
13
BUS
15
15I
TSE
INTERRUPT GENERATION CIRCUIT
15SR
SEARCH RESULT
BUS_IF
15a
SEARCH CONDITION
15S
BUS_IF
15b
COMPARISON CIRCUIT
15C
12
CACHE MEMORY
12b
BUS_IF
DATA
DC
12a
BUS_IF
L2P TABLE
LTC

| TABLE MANAGEMENT PORTION (16bit) | TAG PORTION (24bit) | DATA PORTION (24bit) |
|---|---|---|

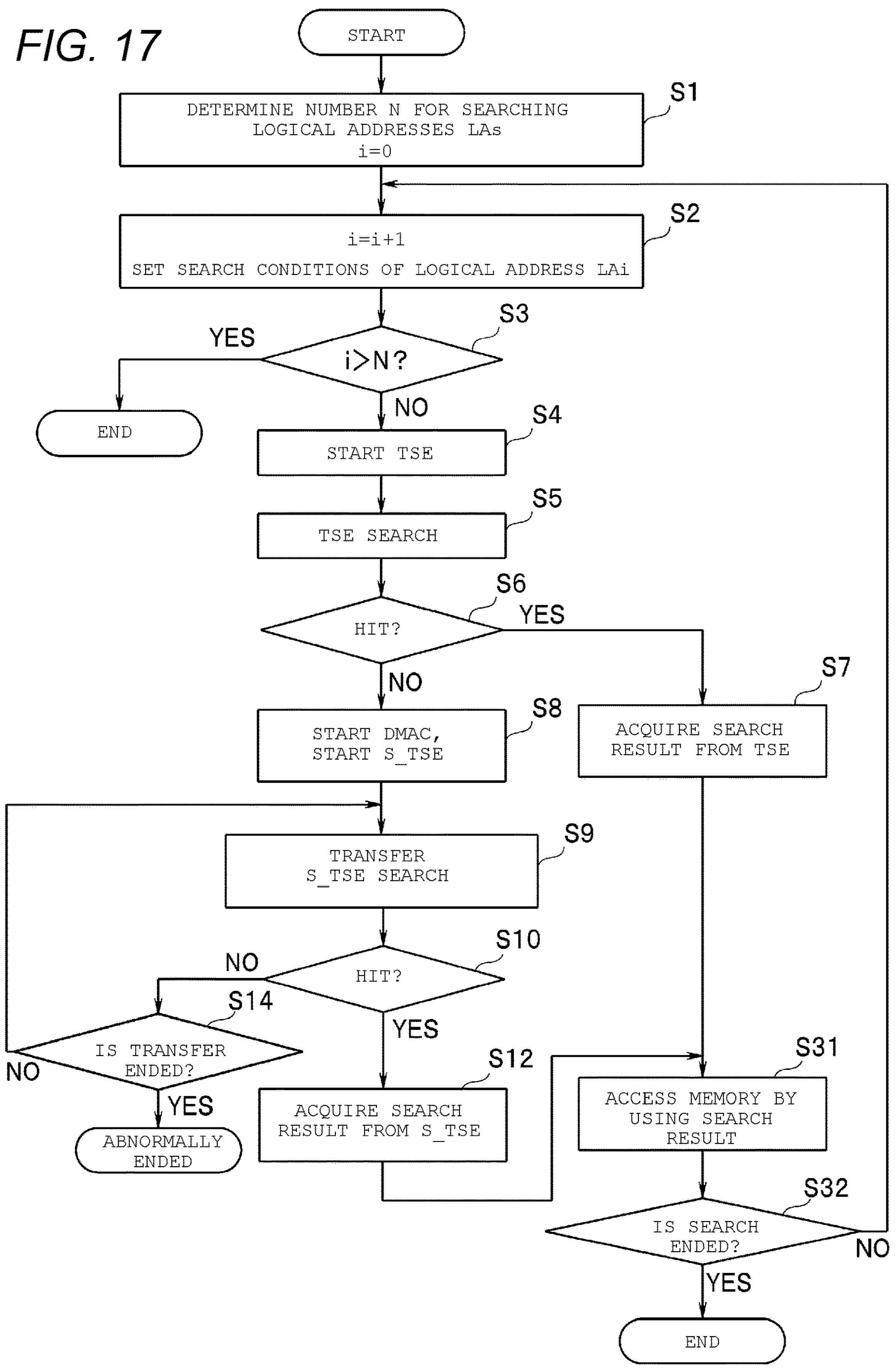

FIG. 17
START
DETERMINE NUMBER N FOR SEARCHING LOGICAL ADDRESSES LAs
i=0
S1
i=i+1
SET SEARCH CONDITIONS OF LOGICAL ADDRESS LAi
S2
i>N?
S3
YES
END
NO
START TSE
S4
TSE SEARCH
S5
HIT?
S6
YES
NO
START DMAC,
START S_TSE
S8
ACQUIRE SEARCH RESULT FROM TSE
S7
TRANSFER S_TSE SEARCH
S9
HIT?
S10
NO
YES
IS TRANSFER ENDED?
S14
NO
YES
ABNORMALLY ENDED
ACQUIRE SEARCH RESULT FROM S_TSE
S12
ACCESS MEMORY BY USING SEARCH RESULT
S31
IS SEARCH ENDED?
S32
NO
YES
END

FIG. 18

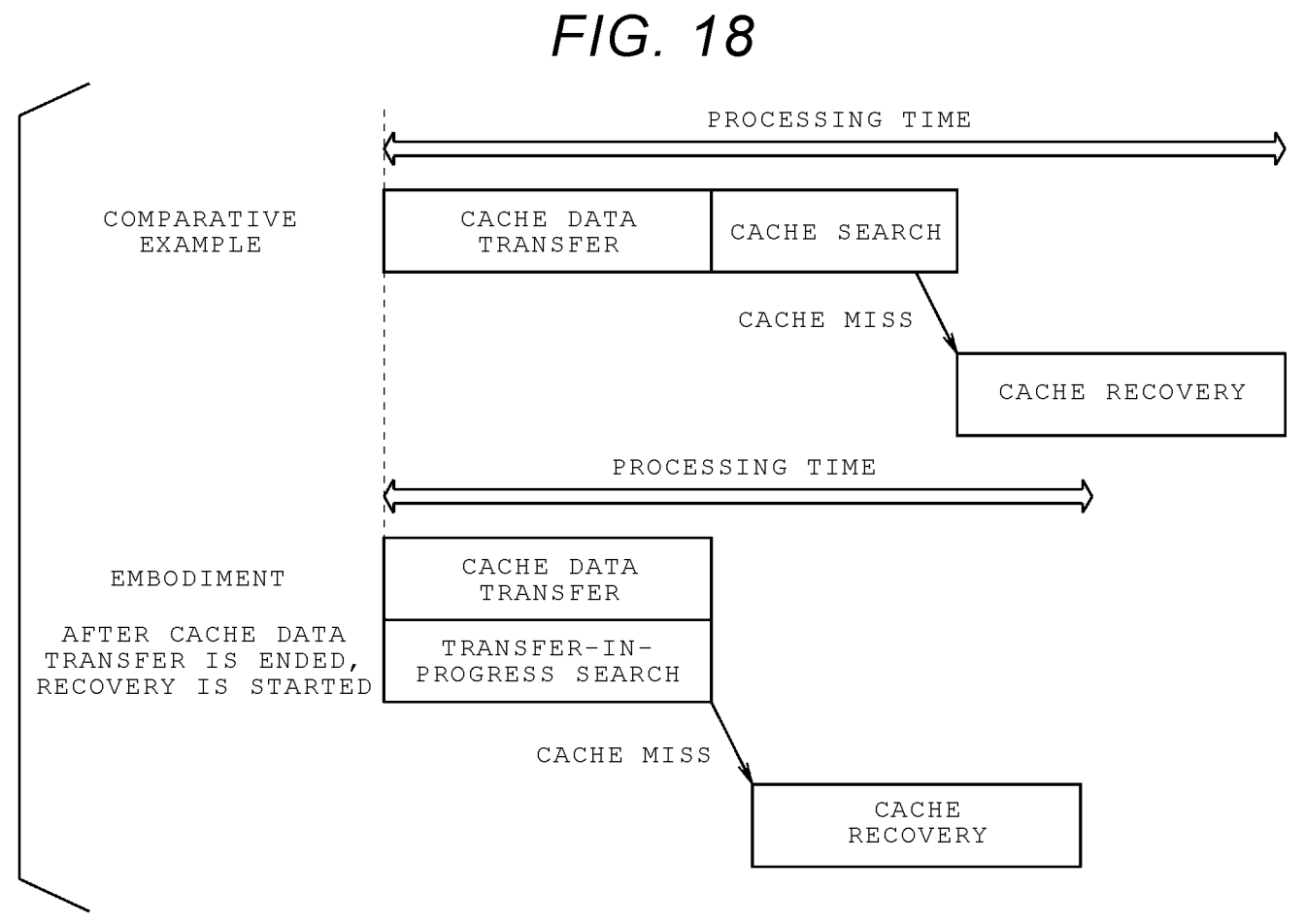

COMPARATIVE EXAMPLE

PROCESSING TIME

CACHE DATA TRANSFER

CACHE SEARCH

CACHE MISS

CACHE RECOVERY

EMBODIMENT

AFTER CACHE DATA TRANSFER IS ENDED, RECOVERY IS STARTED

PROCESSING TIME

CACHE DATA TRANSFER

TRANSFER-IN-PROGRESS SEARCH

CACHE MISS

CACHE RECOVERY

MEMORY SYSTEM AND METHOD OF OPERATING CONTROLLER

CROSS-REFERENCE TO RELATED APPLICATION(S)

This application is based upon and claims the benefit of priority from Japanese Patent Application No. 2022-171756, filed Oct. 26, 2022, the entire contents of which are incorporated herein by reference.

FIELD

Embodiments described herein relate generally to a memory system and a method of operating a controller.

BACKGROUND

In general, a semiconductor storage device may include a memory system that includes a nonvolatile memory such as a NAND flash memory. The memory system includes a nonvolatile memory and a memory controller that controls the nonvolatile memory. The memory controller may include a cache memory. In order to speed up memory access, searching the cache memory at high speed is typically desired.

DESCRIPTION OF THE DRAWINGS

FIG. 1 is a block diagram illustrating a configuration example of a memory system according to a first embodiment.

FIG. 2 is a timing chart illustrating operations of a comparative example.

FIG. 3 is a timing chart illustrating operations of the first embodiment.

FIG. 4 is a flowchart illustrating operations of the first embodiment.

FIG. 5 is a block diagram illustrating a modification example of the first embodiment.

FIG. 6 is a timing chart illustrating operations of a second embodiment.

FIG. 8 is a diagram illustrating an example of cache data updated in a first modification example of the second embodiment.

FIG. 9 is a block diagram illustrating a second modification example of the second embodiment.

FIG. 10 is a block diagram illustrating a configuration example of a third embodiment.

FIG. 12 is a block diagram illustrating a configuration example of a fourth embodiment.

FIG. 17 is a flowchart illustrating operations of the fifth embodiment.

FIG. 18 is a timing chart illustrating operations of a sixth embodiment.

FIG. 19 is a block diagram illustrating a configuration example of a seventh embodiment.

FIG. 20 is a timing chart illustrating operations of the seventh embodiment.

DETAILED DESCRIPTION

Figure 7:
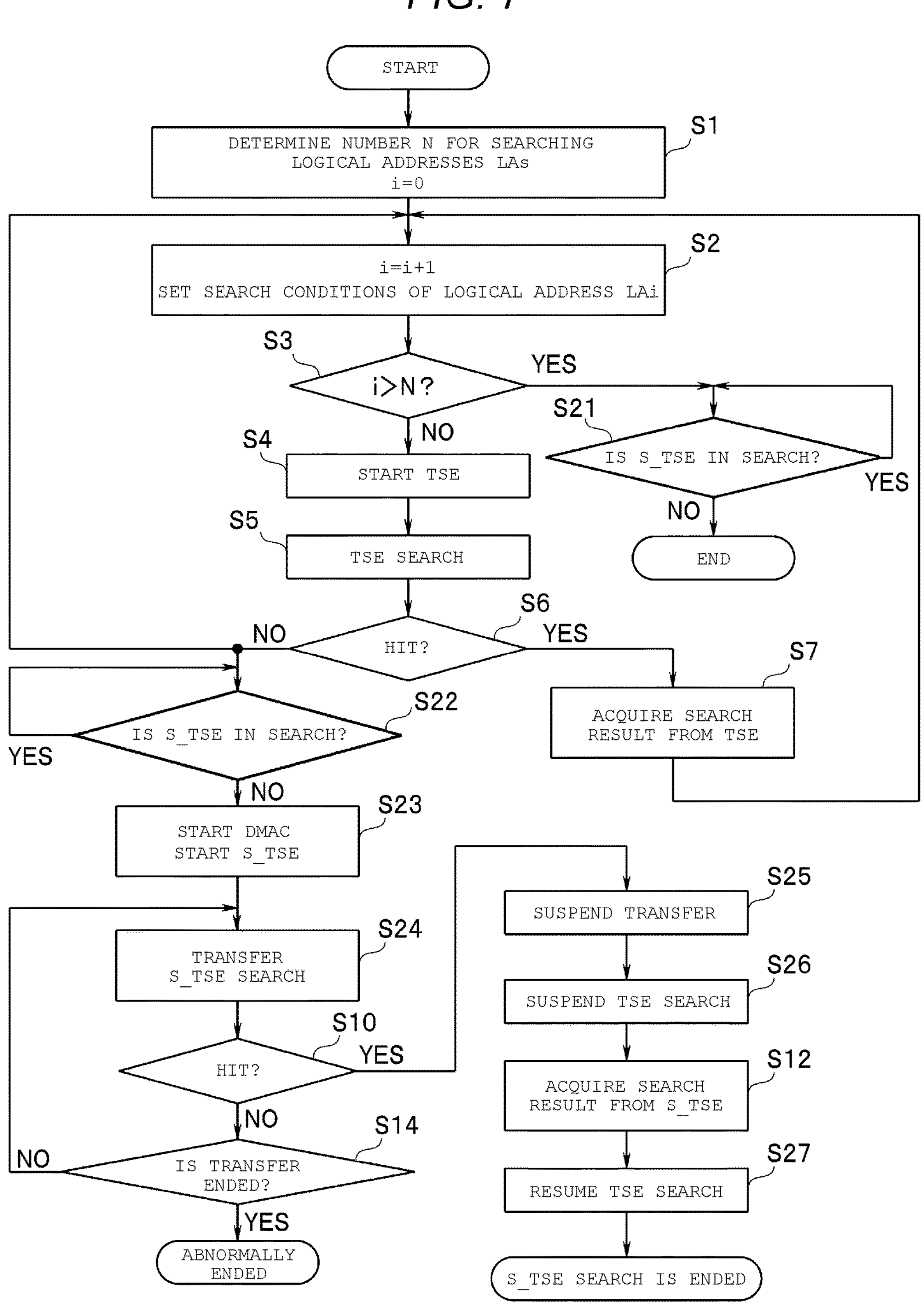
FIG. 7 is a flowchart illustrating operations of the second embodiment.

Embodiments provide a memory system capable of speeding up searching a cache memory.

In general, according to one embodiment, a memory system includes a nonvolatile memory and a memory controller. The memory controller includes a bus, a cache memory connected to the bus, a direct memory access controller connected to the bus, a first search circuit connected to the bus, a second search circuit connected to the bus, and a transfer control circuit connected to the bus. The direct memory access controller is configured to transfer cache target data stored in the nonvolatile memory to the cache memory. The cache target data includes a plurality of entries. The first search circuit is configured to search the cache target data stored in the cache memory. The second search circuit is configured to search the cache target data that is being transferred to the cache memory by the direct memory access controller. The transfer control circuit is configured to assign, in response to the second search circuit detecting a search hit, to the transfer control circuit and the second search circuit, a bus right which has been assigned at least to the cache memory for the transfer of the cache target data to the cache memory. The search hit indicates that a first target entry of the plurality of entries has been detected in the cache target data that is being transferred to the cache memory by the direct memory access controller. The transfer control circuit is configured to obtain, by using the assigned bus right, a search result from the second search circuit via the bus.

Hereinafter, disclosed embodiments will be described in detail with reference to the drawings.

First Embodiment

This embodiment makes it possible to speed up memory access by simultaneously performing the transfer of cache target data from the nonvolatile memory to the cache memory and the search of the transferred cache target data. It is noted that, in this embodiment, an example of the cache target data is a logical-physical address conversion table (hereinafter, referred to as logical to physical (L2P) table), which indicates correspondence of a logical address designated from a host device and a physical address indicating a location of a storage area on a NAND flash memory. The cache target data is, however, not limited thereto.

(Configuration of Memory System)

FIG. 1 is a block diagram illustrating a configuration example of a memory system. A memory system 1 of this embodiment includes a memory controller 2 and a nonvolatile memory 3. It is noted that, in FIG. 1, among the configurations of the memory controller 2, a configuration related to the transfer and search of cache target data is illustrated in detail, and the illustration of the other configurations is omitted. The memory system 1 may be connected to a host device (not illustrated). The host device is, for example, an electronic device such as a personal computer or a mobile terminal.

The memory system 1 may be mounted on a motherboard on which the host device is mounted. The memory system 1 may be configured with a plurality of semiconductor chips. Examples of the memory system 1 include a universal flash storage (UFS) device in which the memory controller 2 and the nonvolatile memory 3 are configured as one package, a memory card such as an SD card, a solid-state-drive (SSD), or an embedded-multi-media-card (eMMC) device.

The nonvolatile memory 3 may include a plurality of memory chips. The nonvolatile memory 3 is, for example, a NAND flash memory having a plurality of memory cells. The nonvolatile memory 3 has a memory cell array including a plurality of memory cell transistors. Each memory cell transistor constitutes an electrically rewritable memory cell. The nonvolatile memory 3 includes a plurality of bit lines BL, a plurality of word lines WL, and a source line CELSRC for controlling voltages applied to the memory cell transistors. The nonvolatile memory 3 includes a plurality of blocks. Each block functions as a minimum unit of a data erase operation. Each block contains a plurality of pages. Each page functions as a unit of a data write operation and a data read operation. It is noted that each word line WL may function as a unit of the data write operation and the data read operation.

Each memory cell of the nonvolatile memory 3 can be written with n (n is an integer of 1 or more) bit data. The memory cell may be a single level cell (SLC) capable of storing 1-bit data. The memory cell may be a multi-level cells (MLC) capable of storing 2-bit data. The memory cell may be a triple level cells (TLC) capable of storing 3-bit data. The memory cell may be a quad level cell (QLC) capable of storing 4-bit data. The nonvolatile memory 3 stores an L2P table LT, which is to be transferred to the memory controller 2 as cache target data.

The memory controller 2 may be configured with a large-scale integrated circuit (LSI) or a system-on-a-chip (SoC). The functions of each component of the memory controller 2 may be implemented by dedicated hardware, a processor performing programs, or a combination thereof.

The memory controller 2 includes a processor 11, a cache memory 12, a bus 13, a direct memory access controller (hereinafter, referred to as a DMAC) 14, a table search engine (hereinafter, referred to as a TSE) 15, a snooping table search engine (hereinafter, referred to as an S_TSE) 16, a host interface circuit (hereinafter, referred to as a host I/F) (not illustrated), and a buffer memory (not illustrated).

The host I/F transmits and receives data to and from the host device. The buffer memory temporarily stores data to be transmitted to or received from the host device. It is noted that the buffer memory is, for example, a general-purpose memory such as a static random access memory (SRAM) or a dynamic random access memory (DRAM).

The processor 11 comprehensively controls each component of the memory system 1 by executing a program (firmware) stored in a ROM (not illustrated). The processor 11 includes a central processing unit (CPU) or the like. When receiving a request from the host device via the host I/F, the processor 11 performs various controls by performing processing according to the request. For example, the processor 11 controls the writing of data to the nonvolatile memory 3 according to requests from the host device. In addition, the processor 11 controls the reading of data from the nonvolatile memory 3 according to requests from the host device.

At least a portion of the L2P table LT stored in the nonvolatile memory 3 is transferred to the cache memory 12 and stored therein. Hereinafter, at least a portion of the L2P table LT stored in the cache memory 12 is referred to as an L2P table cache LTC. It is noted that, in addition to the L2P table cache LTC, the cache memory 12 also stores data read from the nonvolatile memory 3 as cache data DC.

The L2P table LT stored in the nonvolatile memory 3 includes data which associates, in a one-to-one correspondence, a logical address of data received from the host device with a physical address indicating a location of a storage area of the nonvolatile memory 3 where the data are stored. The processor 11 refers to the L2P table cache LTC transferred to the cache memory 12 to convert the logical address designated by the host device into the physical address.

When the processor 11 receives a data write request from the host device, the processor 11 determines a physical address on the nonvolatile memory 3 for storing data received from the host device. That is, the processor 11 manages a data write destination. The processor 11 writes data in a storage area (memory area) of the determined physical address. Then, the processor 11 updates the L2P table cache LTC stored in the cache memory 12 to associate the logical address designated by the write request with the physical address. It is noted that the processor 11 allows the L2P table cache LTC stored in the cache memory 12 to be non-volatilized into the nonvolatile memory 3 at freely selected timing.

In addition, when the processor 11 receives a data read request from the host device, the processor 11 refers to (searches) the L2P table cache LTC stored in the cache memory 12 for a logical address designated by the read request. The processor 11 specifies a physical address associated with the logical address. The processor 11 then reads data from a storage area of the physical address.

The DMAC 14 transfers the L2P table LT stored in the nonvolatile memory 3 to the cache memory 12. The DMAC 14 includes an interrupt generation circuit 14I. When the DMAC 14 receives a transfer request from the processor 11, the DMAC 14 transfers the L2P table LT from the nonvolatile memory 3 to the cache memory 12 via the bus 13, according to settings (hereinafter, referred to as L2P table transfer settings) provided in the transfer request. The L2P table transfer setting includes, for example, an address of the nonvolatile memory 3, an address of the cache memory 12, and the size of the L2P table LT to be transferred. Thus, the L2P table cache LTC, which is a portion of the L2P table LT, is stored in the cache memory 12. When the storage of the L2P table cache LTC in the cache memory 12 is completed, the interrupt generation circuit 14I transmits an interrupt to the processor 11.

The TSE 15 searches the L2P table cache LTC. The TSE 15 is an example of a first search circuit. The TSE 15 includes a comparison circuit 15C, a search register for storing search conditions 15S, a result register for storing search results 15SR, and an interrupt generation circuit 15I.

When the TSE 15 receives a search request from the processor 11, the search conditions 15S (hereinafter, referred to as L2P table search setting) provided in the search request is stored in the search register. The search conditions 15S include, for example, a logical address. The comparison circuit 15C searches the L2P table cache LTC in the cache memory 12 according to the search conditions 15S and acquires the search result 15SR. For example, when the logical address is designated as the search conditions 15S, the comparison circuit 15C acquires a physical address associated with the logical address from the L2P table cache LTC as the search result 15SR. The comparison circuit 15C stores the search result 15SR in the result register. When the search result 15SR is acquired, the interrupt generation circuit 15I transmits an interrupt to the processor 11. The processor 11 then acquires the search results 15SR.

Details of the S_TSE 16 will be described later.

The processor 11 includes a bus interface circuit (hereinafter, referred to as BUS_IF) 11*a*, the cache memory 12 includes BUS_IFs 12*a* and 12*b*, the DMAC 14 includes BUS_IFs 14*a* and 14*b*, the TSE 15 includes BUS_IFs 15*a* and 15*b*, and the S_TSE 16 includes a BUS_IF 16*a*. The BUS_IF 11*a*, the BUS_IFs 12*a* and 12*b*, the BUS_IFs 14*a* and 14*b*, the BUS_IFs 15*a* and 15*b*, and the BUS_IF 16*a* perform the transfer of data via the bus 13. The processor 11 has a bus arbitration function that authorizes one of these bus interface circuits to function as a bus master or to function as a bus slave. Each bus interface circuit obtains a right to use the bus 13 (hereinafter, referred to as bus right) by being set as the bus master or the bus slave by the processor 11. It is noted that the bus arbitration function may be implemented not only by the processor 11 but also by any module in the memory controller 2.

Transfer and Search in Comparative Example

FIG. 2 is a timing chart illustrating the transfer of cache target data (L2P table LT) and the search of cache data in a comparative example. The comparative example has a configuration excluding the S_TSE 16 from the configuration illustrated in FIG. 1. FIG. 2 illustrates the processing of the bus interface circuit acquiring the bus right, the processor 11, the TSE 15, and the DMAC 14, and the access to the cache memory 12.

Herein, the following description of the transfer and search in the comparative example assumes that entries of the L2P table cache LTC corresponding to logical addresses LA1 and LA3 are stored and an entry of the L2P table cache LTC corresponding to a logical address LA2 is not stored in the cache memory 12.

The processor 11 assigns the bus right to the processor 11 (BUS_IF 11*a*) and the TSE 15 (BUS_IF 15*a*) (t1 in FIG. 2). Accordingly, it becomes possible for the processor to access the TSE 15 ("CPU, TSE" of the bus-right in FIG. 2). The processor 11 starts the TSE 15 and designates the logical address LA1 as the search conditions 15S ((0) in FIG. 2).

The processor 11 assigns the bus right to the TSE 15 (BUS_IF 15*b*) and the cache memory 12 (BUS_IF 12*b*) (t2 in FIG. 2). Accordingly, the TSE 15 can access the cache memory 12 ("TSE, cache memory" of the bus right in FIG. 2). The comparison circuit 15C of the TSE 15 searches the L2P table cache LTC for the logical address LA1 (LA1 search at (1) in FIG. 2). The cache memory 12 is read-accessed for searching the L2P table cache LTC for the logical address LA1 (LA1 search read access in FIG. 2). The result of the search is a cache hit (hit). The comparison circuit 15C of the TSE 15 stores the physical address associated with the logical address LA1 in the search result 15SR. The interrupt generation circuit 15I of the TSE 15 transmits an interrupt to the processor 11 ((2) in FIG. 2).

The processor 11 assigns the bus right to the processor 11 (BUS_IF 11*a*) and the TSE 15 (BUS_IF 15*a*) (t3 in FIG. 2). Accordingly, it becomes possible for the processor 11 to access the TSE 15 ("CPU, TSE" of the bus right in FIG. 2). The processor 11 acquires the physical address, which is the search result 15SR, from the TSE 15 ((3) in FIG. 2). Next, the processor 11 sets the search conditions 15S for the search of the logical address LA2 to the TSE 15 ((4) in FIG. 2).

The processor 11 assigns the bus right to the TSE 15 (BUS_IF 15*b*) and the cache memory 12 (BUS_IF 12*b*) (t4 in FIG. 2). Accordingly, the TSE 15 can access the cache memory 12 ("TSE, cache memory" of bus right in FIG. 2). The comparison circuit 15C of the TSE 15 searches the L2P table cache LTC for the logical address LA2 (LA2 search at (5) in FIG. 2). The cache memory 12 is read-accessed for searching the L2P table cache LTC for the logical address LA2 (LA2 search read access in FIG. 2). The search result is a cache miss. The interrupt generation circuit 15I of the TSE 15 transmits an interrupt to the processor 11 ((6) in FIG. 2).

The processor 11 assigns the bus right to the processor 11 (BUS_IF 11*a*) and the TSE 15 (BUS_IF 15*a*) (not illustrated). The processor 11 acquires the search result 15SR (miss) from the TSE 15.

The processor 11 assigns the bus right to the processor 11 (BUS_IF 11*a*) and the DMAC 14 (BUS_IF 14*a*) (t5 in FIG. 2). Accordingly, it becomes possible for the processor 11 to access the DMAC 14 ("CPU, DMAC" of the bus right in FIG. 2). The processor 11 transmits a transfer request for the L2P table LT to the DMAC 14 (start DMAC in FIG. 2). The transfer request includes at least the L2P table transfer setting for transferring the entry corresponding to the logical address LA2.

The processor 11 assigns the bus right to the DMAC 14 (BUS_IF 14*b*) and the cache memory 12 (BUS_IF 12*a*) (t6 in FIG. 2). Accordingly, the DMAC 14 can access the cache memory 12 ("DMAC, cache memory" of the bus right in FIG. 2). The DMAC 14 accesses the nonvolatile memory 3 and reads a portion of the L2P table LT. The DMAC 14 transfers the portion of the read L2P table LT to the cache memory 12 via the BUS_IF 14*b*, the bus 13, and the BUS_IF 12*a* (L2P table transfer of (7) in FIG. 2). The cache memory 12 is write-accessed to transfer the L2P table LT (the L2P table write access of (8) in FIG. 2). When the transfer of the L2P table LT is completed, the interrupt generation circuit 14I of the DMAC 14 transmits an interrupt to the processor 11 ((9) in FIG. 2).

The processor 11 assigns the bus right to the processor 11 (BUS_IF 11*a*) and the TSE 15 (BUS_IF 15*a*) (t7 in FIG. 2). Accordingly, it becomes possible for the processor to access the TSE 15 ("CPU, TSE" of the bus right in FIG. 2). The processor 11 starts the TSE 15 for searching and designates the logical address LA2 as the search conditions 15S ((10) in FIG. 2).

The processor 11 assigns the bus right to the TSE 15 (BUS_IF 15*b*) and the cache memory 12 (BUS_IF 12*b*) (t8 in FIG. 2). Accordingly, the TSE 15 can access the cache memory 12 ("TSE, cache memory" of the bus right in FIG. 2). The comparison circuit 15C of the TSE 15 searches the L2P table cache LTC for the logical address LA2 (LA2 search in (11) of FIG. 2). The cache memory 12 is read-accessed for searching the L2P table cache LTC for the logical address LA2 (LA2 search read access in FIG. 2). The result of the search is a cache hit (hit). The interrupt generation circuit 15I of the TSE 15 transmits an interrupt to the processor 11 ((12) in FIG. 2).

The processor 11 assigns the bus right to the processor 11 (BUS_IF 11*a*) and the TSE 15 (BUS_IF 15*a*) (t9 in FIG. 2). Accordingly, it becomes possible for the processor 11 to access the TSE 15 ("CPU, TSE" of the bus right in FIG. 2). The processor 11 acquires the search result 15SR (hit) from the TSE 15 ((13) in FIG. 2). Next, the processor 11 designates the search conditions 15S for the search of the logical address LA3 to the TSE 15 ((14) in FIG. 2).

The processor 11 assigns the bus right to the TSE 15 (BUS_IF 15*b*) and the cache memory 12 (BUS_IF 12*b*) (t10 in FIG. 2). Accordingly, the TSE 15 can access the cache memory 12 ("TSE, cache memory" of the bus right in FIG.

2). The comparison circuit 15C of the TSE 15 searches the L2P table cache LTC for the logical address LA3 ((15) in FIG. 2).

Thus, in the comparative example, when the cache miss is detected, search target data (cache target data) is transferred from the nonvolatile memory 3 to the cache memory 12, and after the transfer is completed, the cache memory 12 is searched. That is, at the time of the cache miss, two-stage processing of the data transfer and search is required, which has the drawback of increasing the processing time.

(S_TES)

To remedy the drawback, the embodiment employs the S_TSE 16. The S_TSE 16 is an example of a second search circuit. As illustrated in FIG. 1, the S_TSE 16 has a configuration similar to that of the TSE 15. That is, the S_TSE 16 includes a comparison circuit 16C, a search register for storing search conditions 16S, a result register for storing search results 16SR, and an interrupt generation circuit 16I. In this embodiment, data of the L2P table LT transferred from the nonvolatile memory 3 to the cache memory 12 by the DMAC 14 is input to the comparison circuit 16C of the S_TSE 16 via a data bus during the transfer.

When the S_TSE 16 receives a search request from the processor 11, the search conditions 16S (L2P table search setting) provided in the search request are stored in the search register. The search conditions 16S include, for example, a logical address. The comparison circuit 16C searches the L2P table LT input from the DMAC 14 according to the search conditions 16S to acquire the search result 16SR. For example, when a logical address is designated as the search conditions 16S, the comparison circuit 16C acquires a physical address associated with the logical address from the L2P table LT during the transfer as the search result 16SR. The comparison circuit 16C stores the search result 16SR in the result register. When the search result 16SR is acquired, the interrupt generation circuit 16I transmits an interrupt to the processor 11. The processor 11 then acquires the search results 16SR.

As in the comparative example, when the TSE 15 detects a cache miss in searching the L2P table cache LTC, the DMAC 14 transfers the L2P table LT to the cache memory 12. In this embodiment, the S_TSE 16 performs the search during the transfer (hereinafter, referred to as transfer-in-progress search). As a result of the data transfer and search being performed simultaneously, the search results can be acquired at high speed.

In this embodiment, in order for the processor 11 to acquire the search result of the transfer-in-progress search, the processor 11 functions as a transfer control circuit and arbitrates for the bus right, as will be described later.

(Action)

Next, the operations of the embodiment configured as described above will be described with reference to FIG. 3. FIG. 3 is a timing chart illustrating the operations of the first embodiment. FIG. 3 is a timing chart illustrating the transfer of the cache target data (L2P table LT) and search of the cache data. FIG. 3 illustrates the processing of the bus interface circuit acquiring the bus right, the processor 11, the TSE 15, the DMAC 14, and the S_TSE 16, and the access to the cache memory 12. It is noted that FIG. 3 employs the same notation method as in FIG. 2, and the description of the same procedures as in FIG. 2 may be omitted.

Herein, as in FIG. 2, the following description of the transfer and search in the first embodiment assumes that the entries of the L2P table cache LTC corresponding to the logical addresses LA1 and LA3 are stored and the entry of the L2P table cache LTC corresponding to the logical address LA2 is not stored in the cache memory 12.

The processor 11 assigns the bus right to the processor 11 (BUS_IF 11*a*) and the TSE 15 (BUS_IF 15*a*) (t1 in FIG. 3). The processor 11 starts the TSE 15 and designates the logical address LA1 as the search conditions 15S ((0) in FIG. 3).

The processor 11 assigns the bus right to the TSE 15 (BUS_IF 15*b*) and the cache memory 12 (BUS_IF 12*b*) (t2 in FIG. 3). The comparison circuit 15C of the TSE 15 searches the L2P table cache LTC for the logical address LA1 (LA1 search at (1) in FIG. 3). The result of the search is the cache hit (hit). The comparison circuit 15C of the TSE 15 stores a physical address associated with the logical address LA1 in the search result 15SR. The interrupt generation circuit 15I of the TSE 15 transmits an interrupt to the processor 11 ((2) in FIG. 3).

The processor 11 assigns the bus right to the processor 11 (BUS_IF 11*a*) and the TSE 15 (BUS_IF 15*a*) (t3 in FIG. 3). The processor 11 acquires the physical address, which is the search result 15SR, from the TSE 15 ((3) in FIG. 3). Next, the processor 11 designates the search conditions 15S for the search of the logical address LA2 to the TSE 15 ((4) in FIG. 3).

The processor 11 assigns the bus right to the TSE 15 (BUS_IF 15*b*) and the cache memory 12 (BUS_IF 12*b*) (t4 in FIG. 3). The comparison circuit 15C of the TSE 15 searches the L2P table cache LTC for the logical address LA2 (LA2 search at (5) in FIG. 3). The search result is the cache miss. The interrupt generation circuit 15I of the TSE 15 transmits an interrupt to the processor 11 ((6) in FIG. 3).

In this embodiment, when the cache miss is detected, the processor 11 starts the DMAC 14 and the S_TSE 16. That is, the processor 11 assigns the bus right to the processor 11 (BUS_IF 11*a*) and the S_TSE 16 (BUS_IF 16*a*) (t5 in FIG. 3). Accordingly, it becomes possible for the processor 11 to access the S_TSE 16 ("CPU, S_TSE" of the bus right in FIG. 3). The processor 11 starts the S_TSE 16 (start S_TSE in FIG. 3) and designates the logical address LA2 as the search conditions 16S ((7) in FIG. 3).

The processor 11 assigns the bus right to the processor 11 (BUS_IF 11*a*) and the DMAC 14 (BUS_IF 14*a*) (not illustrated). The processor 11 transmits a transfer request for the L2P table LT to the DMAC 14 (start DMAC in FIG. 3). The transfer request includes at least the L2P table transfer setting for transferring the entry corresponding to the logical address LA2.

The processor 11 assigns the bus right to the DMAC 14 (BUS_IF 14*b*) and the cache memory 12 (BUS_IF 12*a*) (t6 in FIG. 3). The DMAC 14 accesses the nonvolatile memory 3 and reads a portion of the L2P table LT. The DMAC 14 transfers the portion of the read L2P table LT to the cache memory 12 via the bus 13 (L2P table transfer of (8) in FIG. 3). The S_TSE 16 snoops or otherwise monitors the portion of the L2P table LT during the transfer. Simultaneously with the transfer of the L2P table LT, the comparison circuit 16C of the S_TSE 16 searches the L2P table LT for the logical address LA2 (transfer-in-progress search) (LA2 search at (8) in FIG. 3).

Thus, in this embodiment, the S_TSE 16 performs the transfer-in-progress search of the L2P table LT simultaneously with the transfer of the L2P table LT. When a physical address corresponding to the logical address LA2 is found as a result of the searching of the L2P table LT during the transfer, the comparison circuit 16C of the S_TSE 16 stores the physical address as the search result 16SR. The interrupt generation circuit 16I of the S_TSE 16 transmits an interrupt to the processor 11 ((9) in FIG. 3). The processor 11 suspends the transfer of the L2P table LT by the DMAC 14.

The processor 11 assigns the bus right to the processor 11 (BUS_IF 11*a*) and the S_TSE 16 (BUS_IF 16*a*) (t7 in FIG. 3). Accordingly, it becomes possible for the processor 11 to access the S_TSE 16 ("CPU, S_TSE" of the bus right in FIG. 3). The processor 11 acquires the physical address, which is the search result 16SR, from the S_TSE 16 ((10) in FIG. 3). After acquiring the physical address, the processor 11 assigns the bus right to the processor 11 (BUS_IF 11*a*) and the DMAC 14 (BUS_IF 14*a*) (not illustrated), starts the DMAC 14 again, and resumes the transfer of the L2P table LT ((11) in FIG. 3).

The processor 11 assigns the bus right to the DMAC 14 (BUS_IF 14*b*) and the cache memory 12 (BUS_IF 12*a*) (t8 in FIG. 3). The DMAC 14 resumes the suspended transfer of the L2P table LT to the cache memory 12 ((12) in FIG. 3).

When the transfer of the L2P table LT completes, the interrupt generation circuit 14I of the DMAC 14 transmits an interrupt to the processor 11 ((13) in FIG. 3).

The processor 11 assigns the bus right to the processor 11 (BUS_IF 11*a*) and the TSE 15 (BUS_IF 15*a*) (t9 in FIG. 3). The processor 11 sets the search conditions 15S for performing the search of the logical address LA3 to the TSE 15 ((14) in FIG. 3).

The processor 11 assigns the bus right to the TSE 15 (BUS_IF 15*b*) and the cache memory 12 (BUS_IF 12*b*) (t10 in FIG. 3). The comparison circuit 15C of the TSE 15 searches the L2P table cache LTC for the logical address LA3 (the LA3 search in (15) of FIG. 3). The search result is the cache hit. The interrupt generation circuit 15I of the TSE 15 transmits an interrupt to the processor 11 ((16) in FIG. 3).

The processor 11 assigns the bus right to the processor 11 (BUS_IF 11*a*) and the TSE 15 (BUS_IF 15*a*) (t11 in FIG. 3). The processor 11 acquires the physical address which is the search result 15SR ((17) in FIG. 3).

Figure 4:
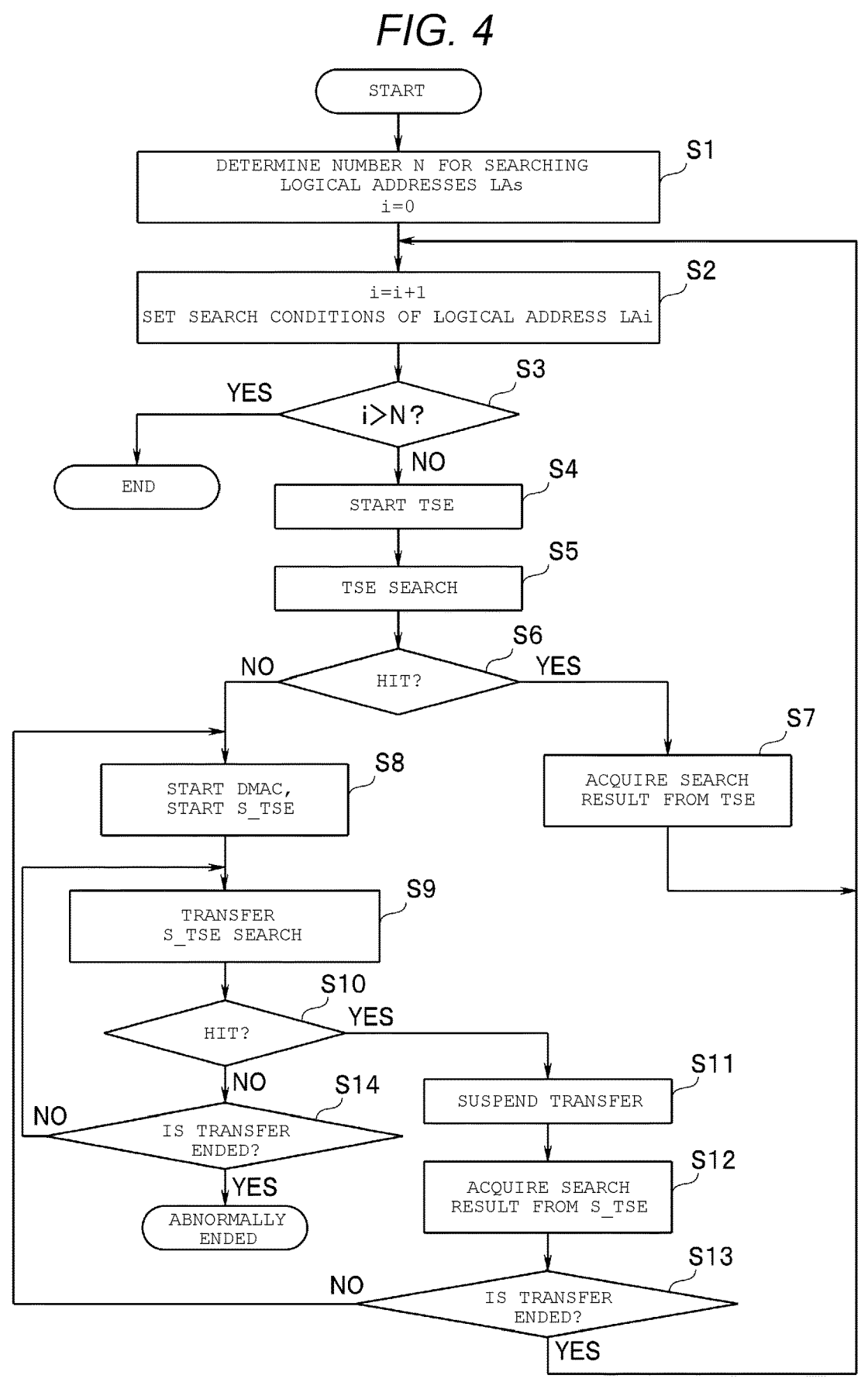

Next, operation of the first embodiment will be described with reference to FIG. 4. FIG. 4 is a flowchart illustrating the operations of the first embodiment.

The processor 11 determines the number N of logical addresses LA that are search targets (S1). In addition, the processor 11 sets a control variable i to 0 (S1).

The processor 11 increments the control variable i (S2). In addition, the processor 11 sets the search conditions 15S including a logical address LAi that is the i-th search target to the TSE 15 (S2).

The processor 11 determines whether the control variable i is larger than N (S3). When the control variable i is larger than N (YES in S3), the processor 11 ends the process.

When the control variable i is equal to or less than N (NO in S3), the processor 11 starts the TSE 15 to search for a physical address corresponding to the logical address LAi (S4).

The comparison circuit 15C of the TSE 15 searches the cache memory 12 using the search conditions 15S (S5). For example, the comparison circuit 15C searches the L2P table cache LTC for the logical address LAi designated in step S2. The interrupt generation circuit 15I transmits an interrupt of the cache hit or the cache miss to the processor 11. The comparison circuit 15C stores the search result 15SR in the result register.

The processor 11 determines whether the interrupt from the TSE 15 is the cache hit or the cache miss (S6).

When the interrupt is the cache hit (YES in S6), the processor 11 acquires the search result from TSE 15 (S7). The processor 11 returns the process to step S2.

When the interrupt is the cache miss (NO in S6), the processor 11 starts the DMAC 14 and the S_TSE 16 (S8). The processor 11 transmits a transfer request of the cache target data to the DMAC 14. For example, the transfer request includes the L2P table transfer settings for transferring the entry corresponding to the logical address LAi. In addition, the processor 11 sets the search conditions 16S to the S_TSE 16. The search conditions 16S includes, for example, the logical address LAi.

The DMAC 14 accesses the nonvolatile memory 3 and reads the cache target data (S9). The DMAC 14 transfers the read cache target data to the cache memory 12 via the bus 13. Meanwhile, the S_TSE 16 snoops the cache target data that is being transferred. The comparison circuit 16C of the S_TSE 16 performs search (transfer-in-progress search) using the search conditions 16S with respect to the cache target data simultaneously with the transfer of the cache target data (S9). As described above, in this embodiment, the S_TSE 16 performs the transfer-in-progress search of the cache target data simultaneously with the transfer of the cache target data such as the L2P table LT.

When the comparison circuit 16C of the S_TSE 16 finds the search target data indicated by the search conditions 16S, the search result 16SR is stored in the result register. The interrupt generation circuit 16I transmits an interrupt of the search hit to the processor 11.

When the processor 11 receives the interrupt of the search hit (YES in S10), the processor 11 suspends the transfer of the cache target data to acquire the search result 16SR (S11). The processor 11 acquires the search result 16SR from the S_TSE 16 (S12).

When the processor 11 acquires the search result 16SR, the processor 11 determines the end of the transfer of the cache target data (S13). The end of transfer of the cache target data is determined, for example, by the presence or absence of an interrupt indicating the end of the transfer from the DMAC 14. When the processor 11 determines that the transfer of the cache target data is ended (YES in S13), the process returns to step S2. It is noted that, when the search target data is found in the last word of the cache target data, it is determined in step S13 that the transfer of the cache target data is ended. When the transfer is not ended (NO in S13), the processor 11 returns the process to step S8.

When the S_TSE 16 does not find the search target data (NO in S10), the DMAC 14 continues to transfer the cache target data (S9) until the end of the transfer (NO in S14). The S_TSE 16 continues the transfer-in-progress search (S9).

When the transfer of the cache target data is ended without the S_TSE 16 finding the search target data (NO in S10), that is, without the YES determination in step S10 even once (YES in S14), the processor 11 abnormally ends the process on the assumption that an exceptional event occurs. It is noted that there is no logical case where the search target data is not found in the transfer-in-progress search of the S_TSE 16. However, the search target data may not be found, for example, due to a physical exceptional event such as destruction of the contents of the L2P table LT in the nonvolatile memory 3.

Thus, in this embodiment, when the cache miss is detected, the memory controller transfers the cache target data to the cache memory. In this case, the transfer-in-progress search is performed by the S_TSE during the transfer of the cache target data. When the search hit is detected, the S_TSE performs interrupt notification of the search hit. The processor suspends the transfer of the cache target data upon the interrupt notification of the search hit, acquires the bus right, and fetches the search result. The processor resumes the transfer of the cache data after the fetching the search results. That is, in this embodiment, the transfer of the cache target data and the search of the transferred cache target data are performed simultaneously. Accordingly, the time required to acquire the cache data can be shortened, and the speed of memory access can be increased.

Modification Example

FIG. 5 is a block diagram illustrating a modification example of the first embodiment. In FIG. 5, the same components as those in FIG. 1 are denoted by the same reference numerals, and the descriptions thereof are omitted.

In the first embodiment illustrated in FIG. 1, the S_TSE 16 is made as a single module. On the other hand, in the modification example illustrated in FIG. 5, the S_TSE 16 is incorporated in a DMAC 17. The DMAC 17 has the same functions as the DMAC 14 and incorporates the S_TSE 16. The S_TSE 16 of this modification example does not have the BUS_IF 16*a*. In the modification example, the processor 11 transmits a transfer request for the L2P table LT to the DMAC 17 via the bus 13 and the BUS_IF 14*a*. In addition, the processor 11 sets the search conditions 16S to the S_TSE 16 via the bus 13 and the BUS_IF 14*a*, and acquires the search result 16SR from the S_TSE 16.

Other configurations and actions are the same as those of the first embodiment.

Thus, in the modification example, the bus interface circuit can be shared by the DMAC 17 and the S_TSE 16, and the circuit scale can be reduced.

Second Embodiment

A second embodiment will be described. FIG. 6 is a timing chart illustrating the operations of the second embodiment. In FIG. 6, the same steps as in FIG. 3 are denoted by the same reference numerals, and the descriptions thereof are omitted. The hardware configuration of this embodiment is the same as that of the first embodiment illustrated in FIG. 1.

In the first embodiment, when the cache miss is detected, the cache target data read from the nonvolatile memory 3 is transferred, and the search (transfer-in-progress search) is performed simultaneously. On the other hand, in this embodiment, the cache target data read upon the detection of the cache miss is not stored in the cache memory 12. That is, this embodiment operates in a mode (referred to as a cache holding mode) in which the cache memory 12 is not updated.

For example, while the memory controller 2 continues to access the nonvolatile memory 3 corresponding to a predetermined logical address range using the L2P table cache LTC, the memory controller 2 may desire to exceptionally access a logical address outside the logical address range. In this case, the memory controller 2 reads an entry of the L2P table LT corresponding to the logical address, which is outside the logical address range, from the nonvolatile memory 3, performs the transfer-in-progress search with the S_TSE 16, and acquires the desired physical address. At this time, since the memory controller 2 operates in the cache holding mode, the cache data (that is, the L2P table cache LTC) stored in the cache memory 12 is not lost. With this configuration, after returning from the exceptional access, the memory controller 2 can resume the suspended continuous access at high speed. In addition, in the cache holding mode, it is possible to suspend reading data from the nonvolatile memory 3 upon the search hit. Accordingly, it is possible to further speed up the memory access.

The processor 11 can operate in the cache holding mode. In the cache holding mode, the processor 11 reads the L2P table LT from the nonvolatile memory 3 and allows the S_TSE 16 to perform the search, and also controls not to transfer the L2P table LT to the cache memory 12. It is noted that the processor 11 may control the bus interface circuit connected to the S_TSE 16 so as not to acquire the bus right.

Furthermore, the processor 11 can set different search conditions for the TSE 15 and the S_TSE 16 in the cache holding mode, and perform parallel searches of both the TSE 15 and the S_TSE 16. For example, the processor 11 performs normal sequential access searches in the TSE 15 and random access searches outside the sequential access range in the S_TSE 16. Accordingly, the processing efficiency can be improved more than the first embodiment.

Next, the operations of the embodiment configured as described above will be described with reference to FIG. 6. FIG. 6 is a timing chart illustrating transfer and search of the L2P table LT in the same way as in FIG. 2. FIG. 6 illustrates the processing of the bus interface circuit acquiring the bus right, the processor 11, the TSE 15, the DMAC 14, and the S_TSE 16, and the access to the cache memory 12.

Herein, as in FIG. 2, the following description of the transfer and search in the second embodiment assumes that the entries of the L2P table cache LTC corresponding to the logical addresses LA1 and LA3 are stored and the entry of the L2P table cache LTC corresponding to the logical address LA2 is not stored in the cache memory 12.

The operations up to t5 in FIG. 6 where the cache miss is detected are the same as in the first embodiment (that is, the operations up to t5 in FIG. 3).

When the cache miss is detected in the search for the logical address LA2 ((6) in FIG. 6), the processor 11 starts the DMAC 14, the TSE 15, and the S_TSE 16. The processor 11 transmits a transfer request for the L2P table LT to the DMAC 14 (start DMAC in FIG. 6). The transfer request includes at least the L2P table transfer setting for transferring the entry corresponding to the logical address LA2. In addition, the processor 11 sets the logical address LA2 as the search conditions 16S to the S_TSE 16 ((7) in FIG. 6). In addition, the processor 11 sets the logical address LA3 to the TSE 15 as the search conditions 15S ((7) in FIG. 6).

The processor 11 assigns the bus right to the TSE 15 (BUS_15*b*) and the cache memory 12 (BUS_IF 12*b*) (t6 in FIG. 6). That is, in this embodiment, the processor 11 starts the DMAC 14 but does not assign the bus right to the DMAC 14 (BUS_IF 14*b*). The DMAC 14 reads a portion of the L2P table LT stored in the nonvolatile memory 3. In this case, the DMAC 14 does not have the bus right and does not store the read L2P table LT into the cache memory 12.

The S_TSE 16 snoops the portion of the L2P table LT during the transfer. Simultaneously with the transfer of the L2P table LT, the comparison circuit 16C of the S_TSE 16 searches (transfer-in-progress search) the L2P table LT using the logical address LA2 (LA2 search at (8) in FIG. 6). In addition, the TSE 15 searches the L2P table cache LTC for the logical address LA3 (LA3 search at (8) in FIG. 6).

Thus, also in this embodiment, the S_TSE 16 performs the transfer-in-progress search for the L2P table LT simultaneously with the transfer of the L2P table LT. In addition, simultaneously with the search for the logical address LA2 by the S_TSE 16, the search for the logical address LA3 by the TSE 15 is also performed.

When a physical address corresponding to the logical address LA2 is found as a result of searching the L2P table LT snooped from the DMAC 14, the comparison circuit 16C of the S_TSE 16 stores the physical address as the search result 16SR. The interrupt generation circuit 16I transmits an interrupt to the processor 11 ((9) in FIG. 6).

When the processor 11 receives the interrupt from the interrupt generation circuit 16I, the processor 11 stops the transfer of the L2P table LT by the DMAC 14 and suspends the search by the TSE 15. That is, when the search target data (that is, the physical address corresponding to the logical address LA2) is found by the S_TSE 16, the transfer of the L2P table LT including the search target data is ended.

The processor 11 assigns the bus right to the processor 11 (BUS_IF 11*a*) and the S_TSE 16 (BUS_IF 16*a*) (t7 in FIG. 6). The processor 11 acquires the physical address, which is the search result 16SR, from the S_TSE 16 ((10) in FIG. 6).

The processor 11 assigns the bus right to the TSE 15 (BUS_IF 15*b*) and the cache memory 12 (BUS_IF 12*b*) (t8 in FIG. 6). The processor 11 allows the TSE 15 to resume the search for the logical address LA3 ((11) in FIG. 6). The comparison circuit 15C of the TSE 15 searches the L2P table cache LTC in the cache memory 12 for the logical address LA3 ((12) in FIG. 6). When the comparison circuit 15C finds the physical address corresponding to the logical address LA3, the comparison circuit 15C stores the physical address as the search result 15SR. The interrupt generation circuit 15I transmits an interrupt to the processor 11 ((13) in FIG. 6).

The processor 11 assigns the bus right to the processor 11 (BUS_IF 11*a*) and the TSE 15 (BUS_IF 15*a*) (t9 in FIG. 6). The processor 11 acquires the search result 15SR ((14) in FIG. 6).

Next, the operations of the second embodiment will be described with reference to FIG. 7. FIG. 7 is a flowchart illustrating the operations of the second embodiment.

Steps S1 to S5, step S7, and step S14 in FIG. 7, that is, the operations at the time of the cache hit detected by the comparison circuit 15C and the abnormal end after the transfer-in-progress search are similar to those of the first embodiment (step S1 to S5, step S7, and step S14 in FIG. 4).

When the control variable i is larger than N (YES in S3), the processor 11 determines whether the S_TSE 16 is performing the transfer-in-progress search (S21). When the transfer-in-progress search is being performed (YES in S21), the processor 11 waits for the end of the transfer-in-progress search. When the transfer-in-progress search is not being performed (NO in S21), the processor 11 ends the process.

When the interrupt from the TSE 15 is the cache miss (NO in S6), the processor 11 returns the process to step S2. Together with step S23 and subsequent steps (described later), this enables the search by the TSE 15 and the transfer-in-progress search by the S_TSE 16 to be performed in parallel. In addition, the processor 11 determines whether the S_TSE 16 is performing the transfer-in-progress search (S22). When the transfer-in-progress search is in progress (YES in S22), the processor 11 waits for the end of the transfer-in-progress search.

When the transfer-in-progress search is not being performed (NO in S22), the processor 11 starts the DMAC 14 without assigning the bus right to the DMAC 14 (S23). The processor 11 transmits a transfer request for the L2P table LT to the DMAC 14. Accordingly, the DMAC 14 accesses the nonvolatile memory 3 and reads the L2P table LT containing the cache miss data (S24).

In addition, the processor 11 starts the S_TSE 16 (S23). The processor 11 sets the search conditions 16S for searching the search target data, which has caused the cache miss, to the S_TSE 16.

The comparison circuit 16C searches the L2P table LT during the transfer by the DMAC 14 using the search conditions 16S (S24).

In this embodiment, the processor 11 starts the DMAC 14 without assigning the bus right to the DMAC 14. Accordingly, the DMAC 14 does not store the L2P table LT read from the nonvolatile memory 3 into the cache memory 12 during the transfer-in-progress search by the S_TSE 16.

The comparison circuit 16C stores the search result 16SR in the result register when the search target data is found by the transfer-in-progress search. The interrupt generation circuit 16I transmits an interrupt of the search hit to the processor 11.

When the processor 11 receives the interrupt of the search hit (YES in S10), the processor 11 suspends the transfer of the L2P table LT by the DMAC 14 (that is, suspends reading) (S25). In addition, the processor 11 suspends the search by the TSE 15 started in step S4 (S26).

The processor 11 assigns the bus right to the processor 11 (BUS_IF 11*a*) and the S_TSE 16 (BUS_IF 16*a*). The processor 11 acquires the search result 16SR from the S_TSE 16 (S12). In addition, the processor 11 resumes the search by the TSE 15 that is suspended in step S26 (S27). The transfer-in-progress search by the S_TSE 16 is ended here.

In this manner, in this embodiment, the same effects as those of the first embodiment can be obtained. In addition, in this embodiment, in the reading of the L2P table LT when the cache miss is detected by the TSE 15, the transfer-in-progress search can be performed without storing the L2P table LT into the cache memory 12. Accordingly, the memory controller 2 can operate in the cache holding mode, and can prevent the L2P table cache LTC in the cache memory 12 from being overwritten.

In addition, as described above, the memory controller 2 can set the different search conditions for the TSE 15 and the S_TSE 16 in the cache holding mode, and perform the parallel searches using both. Accordingly, the processing efficiency can be further improved.

First Modification Example

Figure 8:
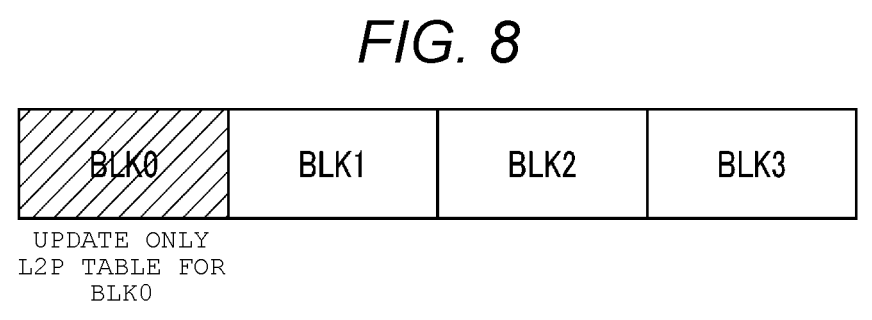

FIG. 8 is a diagram illustrating an example of cache data updated in a first modification example of the second embodiment. In the second embodiment, the example where the L2P table LT read by the DMAC 14 is not transferred to the cache memory 12 is described. The memory controller 2, however, may update only a portion of the L2P table cache LTC stored in the cache memory 12 with the L2P table LT read by the DMAC 14. For example, the memory controller 2 selects a portion of the L2P table LT according to a logical address or a physical address indicated by the L2P table. The memory controller 2 selects the portion of the L2P table LT, for example, for each logical address range, each chip, each plane, or each block. Then, the memory controller 2 updates only a portion of the L2P table cache LTC stored in the cache memory 12 by using the selected portion of the L2P table LT.

FIG. 8 illustrates an example where the memory controller 2 selects the L2P table LT for each block and only the L2P table cache LTC corresponding to a block BLK0 is updated.

Thus, in the first modification example, it is possible to store only necessary cache target data (L2P table LT) into the cache memory 12.

Second Modification Example

FIG. 9 is a block diagram illustrating a second modification example of the second embodiment. In FIG. 9, the same components as those in FIG. 1 are denoted by the same reference numerals, and the descriptions thereof are omitted. This modification example is different from the first embodiment in that, instead of the cache memory 12, a cache memory 12T including an area of a temporary memory TMEM is employed.

In the second modification example, the memory controller 2 temporarily stores the L2P table LT read from the nonvolatile memory 3 by the DMAC 14 in the temporary memory TMEM. When the search hit is detected during the transfer-in-progress search by the S_TSE 16, the processor 11 transfers the data stored in the temporary memory TMEM to the L2P table cache LTC. On the other hand, when a search miss is detected during the transfer-in-progress search of the S_TSE 16, the processor 11 discards the data in the temporary memory TMEM and does not update the L2P table cache LTC.

In this manner, in the second modification example, it is possible to store only the necessary cache target data (L2P table LT) into the cache memory 12.

Third Embodiment

A third embodiment will be described. FIG. 10 is a block diagram illustrating the third embodiment. In FIG. 10, the same components as those in FIG. 1 are denoted by the same reference numerals, and the description thereof is omitted. In this embodiment, the searching of data in the cache memory 12 and the searching of cache target data to be transferred to the cache memory 12 can be processed in parallel.

This embodiment is different from the first embodiment in that a bus 21 is employed instead of the bus 13. The bus 21 includes the buses of a plurality of paths. Therefore, the processor 11 can assign the bus right to the DMAC 14 and the cache memory 12 simultaneously with assigning the bus right to the TSE 15 and the cache memory 12. Accordingly, it becomes possible for the processor 11 to simultaneously perform the data transfer between the TSE 15 and the cache memory 12 and the data transfer between the processor 11 and the S_TSE 16.

Other configurations are the same as those of the first embodiment.

Figure 11:
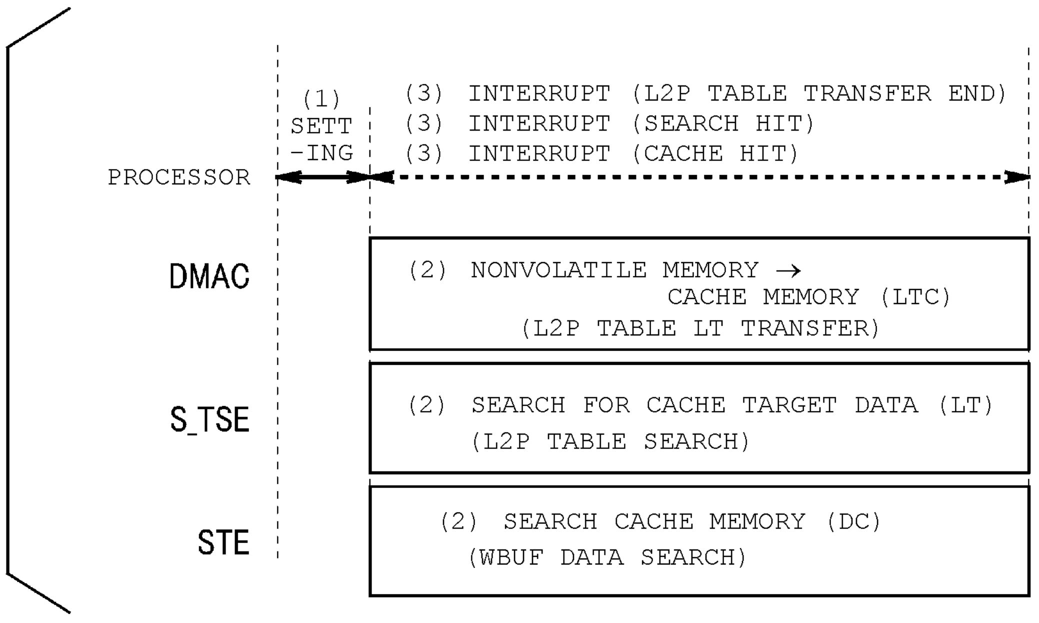
FIG. 11 is a diagram illustrating operations of the third embodiment.

Next, the operations of the embodiment configured in this manner will be described with reference to FIG. 11. FIG. 11 is a diagram illustrating the operations of the third embodiment. FIG. 11 illustrates processing steps corresponding to the data transfer indicated by (1) to (3) in FIG. 10.

The processor 11 starts the DMAC 14. The processor 11 allows the DMAC 14 to read the L2P table LT from the nonvolatile memory 3 and performs setting for transferring the L2P table LT to the cache memory 12 ((1) setting in FIG. 11). That is, the processor 11 transmits the L2P table transfer setting ((1) in FIG. 10) to the DMAC 14. In addition, the processor 11 transmits the L2P table search setting ((1) in FIG. 10) to the S_TSE 16 ((1) setting in FIG. 11). Furthermore, in this embodiment, the processor 11 allows the search by the S_TSE 16 and a WBUF data search by the TSE 15 to be performed in parallel. That is, the processor 11 transmits a WBUF data search setting ((1) in FIG. 10) to the TSE 15. It is noted that the WBUF data search is, for example, a process of searching whether data to be transmitted to the host device exists in the cache memory 12 as the cache data DC.

Accordingly, the DMAC 14 reads the L2P table LT from the nonvolatile memory 3 and transfers the L2P table LT to the cache memory 12 ((2) L2P table transfer in FIG. 10). The S_TSE 16 performs the transfer-in-progress search on the cache target data (L2P table LT) read from the nonvolatile memory 3 ((2) L2P table search in FIG. 10). Furthermore, the TSE 15 performs the WBUF data search ((2) WBUF data search in FIG. 10) in parallel with the search by the S_TSE 16.

As illustrated in FIG. 11, the transfer of the L2P table LT, the transfer-in-progress search, and the WBUF data search are performed simultaneously. When the search hit is detected in the transfer-in-progress search by the S_TSE 16, the interrupt generation circuit 16I transmits an interrupt indicating the search hit to the processor 11 ((3) interrupt (search hit) in FIG. 10). The processor 11 acquires the search results from the S_TSE 16. In addition, when the cache hit is detected in the WBUF data search by the TSE 15, the interrupt generation circuit 15I transmits an interrupt indicating the cache hit to the processor 11 ((3) interrupt (cache hit) in FIG. 10). The processor 11 acquires the search result 15SR from the TSE 15 and transfers the cache data to the host device. This embodiment attempts to increase the speed of access to the nonvolatile memory 3 accordingly. In addition, when the transfer of the L2P table LT is ended, the DMAC 14 notifies the processor 11 of the end of the transfer ((3) interrupt (L2P table transfer end) in FIG. 10).

As described above, in this embodiment, parallel processing of the WBUF data search by the TSE and the transfer-in-progress search by the S_TSE is possible. Note that this embodiment may be applied when the S_TSE is provided in the DMAC, like the modification example of the first embodiment illustrated in FIG. 5. In this case, a circuit corresponding to the bus interface circuit 16*a* is unnecessary. Therefore, this embodiment can prevent an increase in the scale of hardware compared to the case where parallel processing is achieved by providing two TSE modules.

Fourth Embodiment

A fourth embodiment will be described. FIG. 12 is a block diagram illustrating the fourth embodiment. In FIG. 12, the same components as in FIG. 1 are denoted by the same reference numerals, and the descriptions thereof are omitted. This embodiment makes it possible to perform parallel search for a plurality of logical addresses while transferring the L2P table LT (cache target data).

The fourth embodiment illustrated in FIG. 12 is different from the first embodiment illustrated in FIG. 1 in that an S_TSE 25 is employed instead of the S_TSE 16. The S_TSE 25 includes a search unit 25S. The search unit 25S has a plurality of configurations each similar to the comparison circuit 16C, a search register storing the search conditions 16S, and a result register storing the search result 16SR. The search unit 25S can perform parallel search using the plurality of logical addresses with respect to the L2P table LT read from the nonvolatile memory 3 by the DMAC 14.

Figure 13:
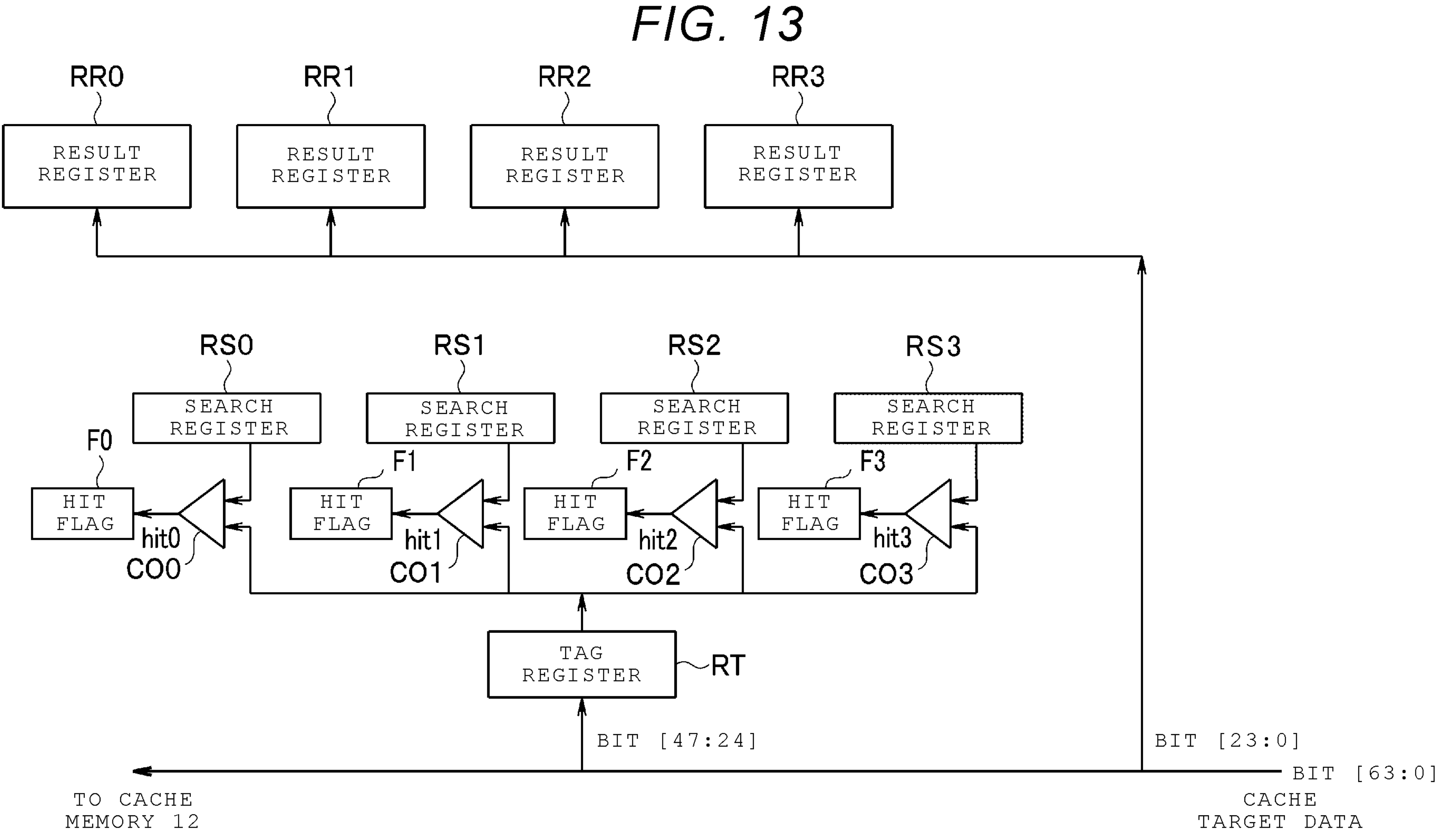
FIG. 13 is a circuit diagram illustrating an example of a specific configuration of a search unit according to the fourth embodiment.

FIG. 13 is a circuit diagram illustrating an example of a specific configuration of the search unit 25S.

The search unit 25S includes a tag register RT, search registers RS0 to RS3 (hereinafter, referred to as a search register RS when unnecessary to distinguish), result registers RR0 to RR3 (hereinafter, referred to as a result register RR when unnecessary to distinguish), comparison circuits CO0 to CO3 (hereinafter, referred to as a comparison circuit CO when unnecessary to distinguish), and hit flags F0 to F3 (hereinafter, referred to as a hit flag F when unnecessary to distinguish).

Figures 14, 15:
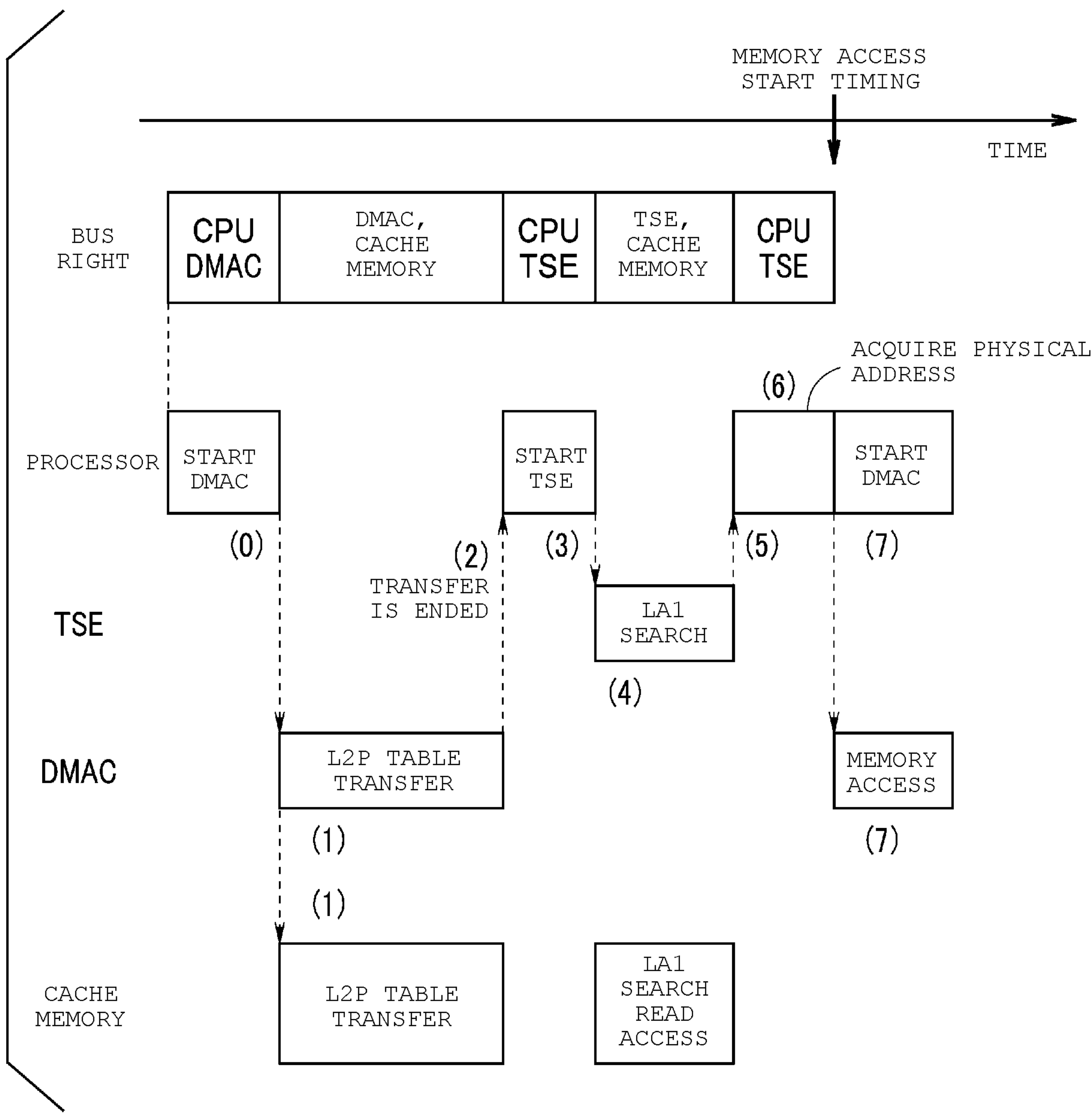
FIG. 14 is a diagram illustrating a data format of cache target data according to the fourth embodiment.
FIG. 15 is a timing chart illustrating operations of a comparative example.

FIG. 14 is an explanatory diagram illustrating a data format of the L2P table LT. FIG. 14 illustrates an example where the bus width for transferring the L2P table LT is 64 bits. The L2P table LT (64 bits) has a table management portion in 16 bits, a tag portion in the next 24 bits, and a data portion in the next 24 bits. The tag portion contains a logical address and the data portion contains a physical address corresponding to the logical address of the tag portion. The table management portion stores a flag indicating whether the search is valid or invalid. When the flag of the table management portion is invalid, the search unit 25S determines the search miss even when the tag portion is hit.

As illustrated in FIG. 13, among the 64-bit cache target data (L2P table LT) read from the nonvolatile memory 3 by the DMAC 14, the tag portion (logical address) of bits [47:24] is supplied to the tag register RT, and the data portion (physical address) of bits [23:0] is supplied to the result register RR. The logical address of the tag portion stored in the tag register RT is supplied to the comparison circuits CO0 to CO3. The logical address of the tag portion and the physical address of the data portion are associated with each other. That is, the logical addresses supplied to the comparison circuits CO0 to CO3 correspond to the physical addresses of the data portion supplied to the result registers RR0 to RR3, respectively.

Four logical addresses are supplied as the search conditions from the processor 11 and stored in the search registers RS0 to RS3. The comparison circuits CO0 to CO3 respectively compare the logical addresses supplied from the search registers RS0 to RS3 with the logical address supplied from the tag register RT. The comparison circuits CO0 to CO3 respectively assert hit signals hit0 to hit3 when the corresponding two inputs match. The hit flags F0 to F3 are set upon the hit signals hit0 to hit3 being asserted, respectively.

It is noted that, although the example of FIG. 13 illustrates an example of the parallel search for the four logical addresses, any number of parallel searches can be used by increasing or decreasing the numbers of search registers RS, result registers RR, comparison circuits CO, and hit flags F.

In this embodiment configured as described above, the L2P table LT that is being transferred is searched during the transfer by the DMAC 14, in the same manner as in the first embodiment. In this embodiment, the plurality of searches are performed in parallel in the search.

The processor 11 sets the four logical addresses of the search targets in the search registers RS0 to RS3. The value of the tag portion of the cache target data (L2P table LT) during the transfer is supplied from the tag register RT to the comparison circuit CO. The comparison circuit CO asserts a hit signal when the value of the tag portion matches the value of the search register RS. The hit flag F is set when the hit signal is asserted. The comparison circuits CO0 to CO3 can perform the parallel search for the four logical addresses in one clock, and the physical addresses hit by the search are set in the result registers RR0 to RR3.

In this manner, one of the four logical addresses hit by the search is obtained. It is noted that the S_TSE 25 determines the search miss when none of the hit flags F is set at the timing of completion of the transfer of the cache target data.

It is noted that FIG. 13 illustrates a configuration example where, when the four different search conditions are stored in the four search registers and any one of the four search conditions is hit, it is determined as the search hit. In a case where the search result for one search condition is transferred to the processor 11 each time the result is determined, a single result register RR alone may be sufficient.

Other actions are the same as in the first embodiment.

In this manner, in this embodiment as well, the same effects as in the first embodiment can be obtained. In addition, this embodiment has the advantage that parallel searches can be performed for the plurality of cache target data.

Fifth Embodiment

A fifth embodiment will be described. The hardware configuration of this embodiment is the same as that of the modification example of the first embodiment illustrated in FIG. 5. This embodiment enables memory access in a short period of time after the transfer-in-progress search.

FIG. 15 is a timing chart illustrating memory access in a comparative example. It is noted that the comparative example does not have the S_TSE 16. FIG. 15 illustrates the processing of the bus interface circuit, the processor 11, the TSE 15, and the DMAC 17, each of which acquires the bus right, and the access to the cache memory 12, by using the same notation method as in FIG. 2.

Herein, the following description of the transfer and search in the comparative example assumes that the entry of the L2P table cache LTC corresponding to the logical address LA2 is stored and that corresponding to the logical address LA1 is not stored in the cache memory 12.

The cache miss is detected when the TSE 15 performs the search for the logical address LA1. In this case, the processor 11 starts the DMAC 17 and assigns the bus right to the DMAC 17 and the cache memory 12. The processor 11 instructs the DMAC 17 to transfer the L2P table LT ((0) in FIG. 15).

The DMAC 17 accesses the nonvolatile memory 3 and reads a portion of the L2P table LT. The DMAC 17 transfers the portion of the read L2P table LT to the cache memory 12 via the BUS_IF 14*b*, the bus 13, and the BUS_IF 12*a* ((1) L2P table transfer in FIG. 15). When the data transfer is ended, the interrupt generation circuit 14I of the DMAC 17 transmits an interrupt to the processor 11 ((2) in FIG. 15). It is noted that the comparative example does not have the S_TSE 16, and the transfer-in-progress search is not performed.

The processor 11 starts the TSE 15 and instructs the search for the logical address LA1 ((3) in FIG. 15) in order to perform the search for the logical address LA1 again. In this case, the processor 11 assigns the bus right to the TSE 15 and the cache memory 12.

The comparison circuit 15C of the TSE 15 searches the L2P table cache LTC for the logical address LA1 ((4) LA1 search in FIG. 15). The search result in this case is the cache hit. The comparison circuit 15C stores the search result 15SR in the result register. The interrupt generation circuit 15I transmits an interrupt to the processor 11 ((5) in FIG. 15). The processor 11 assigns the bus right to the processor 11 and the TSE 15. The processor 11 acquires the search result 15SR from the TSE 15 ((6) in FIG. 15). The processor 11 uses the physical address in the search result 15SR to instruct the DMAC 17 to access the nonvolatile memory 3 ((7) memory access in FIG. 15).

Thus, in the comparative example, after transferring the L2P table LT, which is the cache target data, the TSE 15 needs to perform the search again, and there is a drawback that the processing time required for the start timing of the memory access is long.

Figure 16:
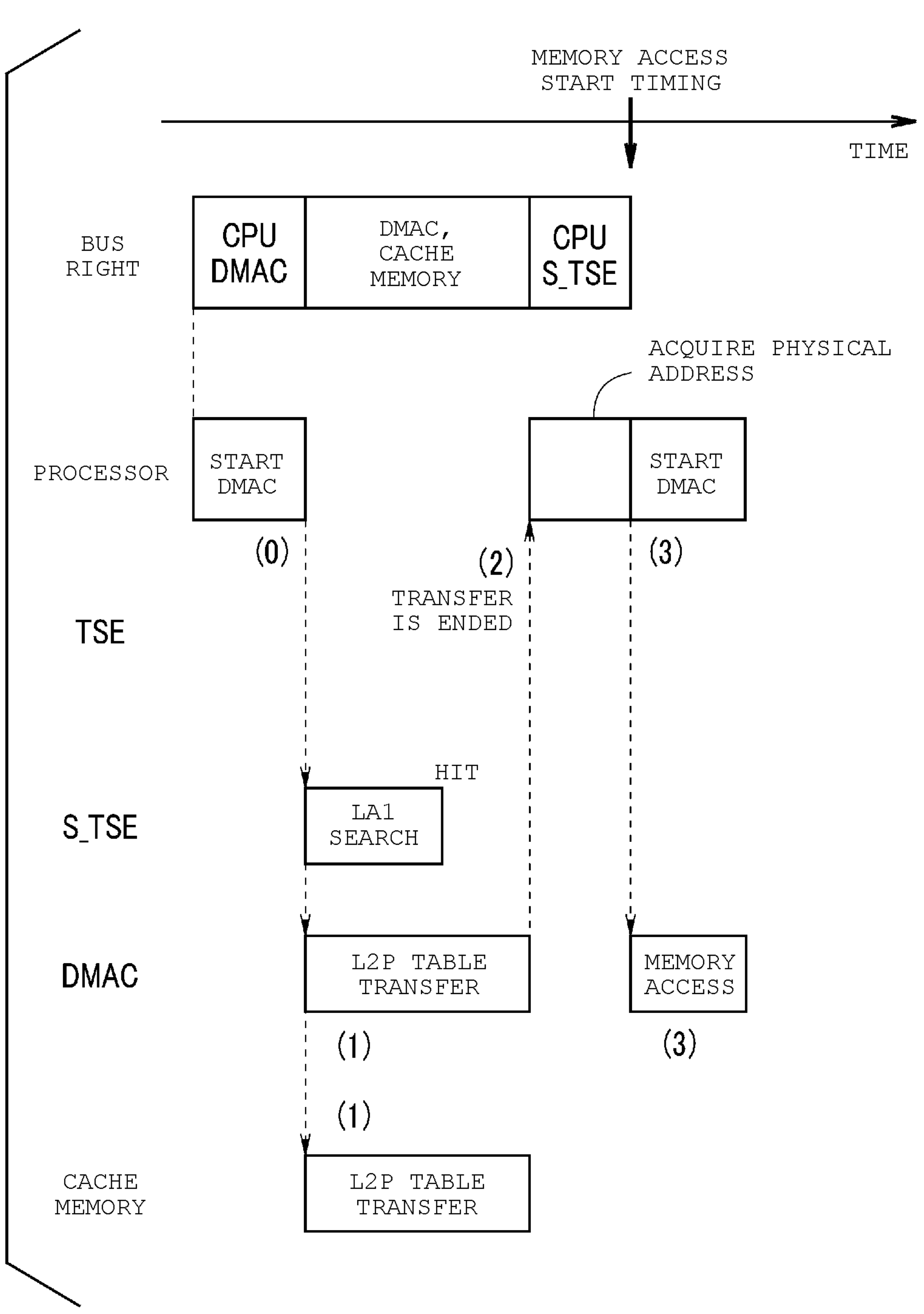
FIG. 16 is a timing chart illustrating operations of a fifth embodiment.

Next, operations in the fifth embodiment will be described with reference to FIG. 16. FIG. 16 is a timing chart illustrating memory access in the fifth embodiment. FIG. 16 illustrates the processing of the bus interface circuit, the processor 11, the TSE 15, the S_TSE 16, and the DMAC 17, each of which acquires the bus right, and the access to the cache memory 12, by the same notation method as in FIG. 3.

Herein, in the same way as in FIG. 15, the following description of the transfer and search in this embodiment assumes that the entry of the L2P table cache LTC corresponding to the logical address LA2 is stored and that corresponding to the logical address LA1 is not stored in the cache memory 12.

The cache miss is detected when the TSE 15 performs the search for the logical address LA1. In this case, the processor 11 starts the DMAC 17, and assigns the bus right to the DMAC 17 and the cache memory 12. The processor 11 instructs the DMAC 17 to transfer the L2P table LT ((0) in FIG. 16).

The DMAC 17 accesses the nonvolatile memory 3 and reads a portion of the L2P table LT. The DMAC 17 transfers the portion of the read L2P table LT to the cache memory 12 via the BUS_IF 14*b*, the bus 13, and the BUS_IF 12*a* ((1) L2P table transfer in FIG. 16). The S_TSE 16 searches the L2P table LT read by the DMAC 17 (the LA1 search in FIG. 16). The S_TSE 16 acquires the search result 16SR and stores the search result 16SR in the result register. When the data transfer is ended, the DMAC 17 transmits an interrupt to the processor 11 ((2) in FIG. 16).

In this embodiment, the DMAC 17 performs notification of the transfer completion and simultaneously performs notification of the search hit detected by the S_TSE 16 ((2) in FIG. 16). The processor 11 assigns the bus right to the processor 11 and the S_TSE 16 upon receiving the notification of the search hit. The processor 11 acquires the search result 16SR from the S_TSE 16. The processor 11 uses the physical address in the search result 16SR to instruct the DMAC 17 to access the nonvolatile memory 3 ((3) in FIG. 16, the memory access). That is, when the processor 11 detects the search hit during the transfer of the cache target data, the processor 11 can immediately start the memory access by using the hit physical address. As is clear from the comparison between FIGS. 15 and 16, in this embodiment, the time required up to the memory access start timing can be shortened compared to the comparative example.

Next, operations in the fifth embodiment will be described with reference to FIG. 17. FIG. 17 is a flowchart illustrating the operations of the fifth embodiment.

Steps S1 to S7 in FIG. 17, that is, the operations up to the search result acquisition at the time of the cache hit by the TSE 15, steps S8 and S9 in FIG. 17, that is, the operations up to the performing of the transfer-in-progress search after the cache miss, and steps S10 and S14 in FIG. 17, that is, the operation at the time of the search miss, are the same as in the first embodiment (steps S1 to S7, steps S8 and S9, and steps S10 and S14 in FIG. 4).

When the interrupt from the TSE 15 is the cache miss (NO in S6), the processor 11 starts the DMAC 17 and the S_TSE 16 (S8). In this case, the processor 11 assigns the bus right to the DMAC 17 and the cache memory 12 and instructs the DMAC 17 to start transferring the L2P table LT.

The DMAC 17 accesses the nonvolatile memory 3 and reads a portion of the L2P table LT. The DMAC 17 transfers the portion of the read L2P table LT to the cache memory 12 via the BUS_IF 14*b*, the bus 13, and the BUS_IF 12*a* (S9). The comparison circuit 16C of the S_TSE 16 performs the transfer-in-progress search (S9). The interrupt generation circuit 14I of the DMAC 17 transmits an interrupt to the processor 11 when the data transfer is ended. In this embodiment, the DMAC 17 also transmits the search hit notification by the S_TSE 16 to the processor 11 simultaneously with transmitting the interrupt of the transfer end.

When the processor 11 receives the interrupt of the transfer end, the processor 11 determines the search hit (S10). When the processor 11 detects the search hit (YES in S10), the processor 11 assigns the bus right to the processor 11 and the S_TSE 16, and acquires the search result 16SR from the result register of the S_TSE 16 (S12).

The processor 11 uses the physical address in the search result 16SR to instruct the DMAC 17 to access the nonvolatile memory 3 (S31). It is noted that the DMAC 17 has a command queue. The command queue may enable the processor 11 to issue a plurality of memory access commands respectively corresponding to a plurality of physical addresses acquired by the end of transfer to the DMAC 17.

As described above, in this embodiment, the same effect as in the first embodiment can be obtained, and the memory access can be performed immediately when the search hit occurs during the transfer-in-progress search. Accordingly, this embodiment can further speed up the processing.

Sixth Embodiment

A sixth embodiment will be described. FIG. 18 is a timing chart illustrating the operations of the sixth embodiment. The hardware configuration of this embodiment is the same as that of the first embodiment illustrated in FIG. 1. This embodiment enables cache recovery in a short time after the transfer-in-progress search.

As described above, the L2P table cache LTC stored in the cache memory 12 is a portion of the L2P table LT stored in the nonvolatile memory 3. When the TSE 15 detects a cache miss, the DMAC 14 transfers the L2P table LT from the nonvolatile memory 3 to the cache memory 12. Herein, when there are a plurality of candidates for the storage location of the L2P table LT in the nonvolatile memory 3, the cache miss may occur even in searching the transferred L2P table LT. In this case, the cache recovery is performed to reconfigure the L2P table cache LTC by transferring the L2P table LT again.

FIG. 18 illustrates the processing time on the horizontal axis. The upper part of FIG. 18 illustrates the timing of the cache recovery in a comparative example. The lower part of FIG. 18 illustrates the timing of the cache recovery in this embodiment. It is noted that the comparative example does not have the S_TSE 16.

In the comparative example, as illustrated in the upper part of FIG. 18, the TSE 15 performs cache search after the L2P table LT is transferred. When the cache miss (hit miss) occurs as a result of the cache search by the comparison circuit 15C, the processor 11 performs the cache recovery. That is, in the comparative example, the cache recovery is performed after the transfer of the L2P table LT is ended and the cache search is ended.

On the other hand, in the sixth embodiment, as illustrated in the lower part of FIG. 18, the S_TSE 16 performs the transfer-in-progress search during the transfer of the L2P table LT. When the processor 11 receives an interrupt from the DMAC 14 at the time of the transfer end of the L2P table LT, the processor 11 determines whether the S_TSE 16 has detected the search miss. The processor 11 performs the cache recovery when the S_TSE 16 has detected the search miss.

As a result, as is clear from FIG. 18, in this embodiment, the start time of the cache recovery can be made earlier than in the comparative example, and the speed of the cache recovery can be increased.

As described above, in this embodiment, the same effect as in the first embodiment can be obtained, and when the search miss occurs due to the transfer-in-progress search, the cache recovery can be performed immediately, and increasing the speed of the cache recovery can improve the processing efficiency of the system.

Seventh Embodiment

Figure 19:
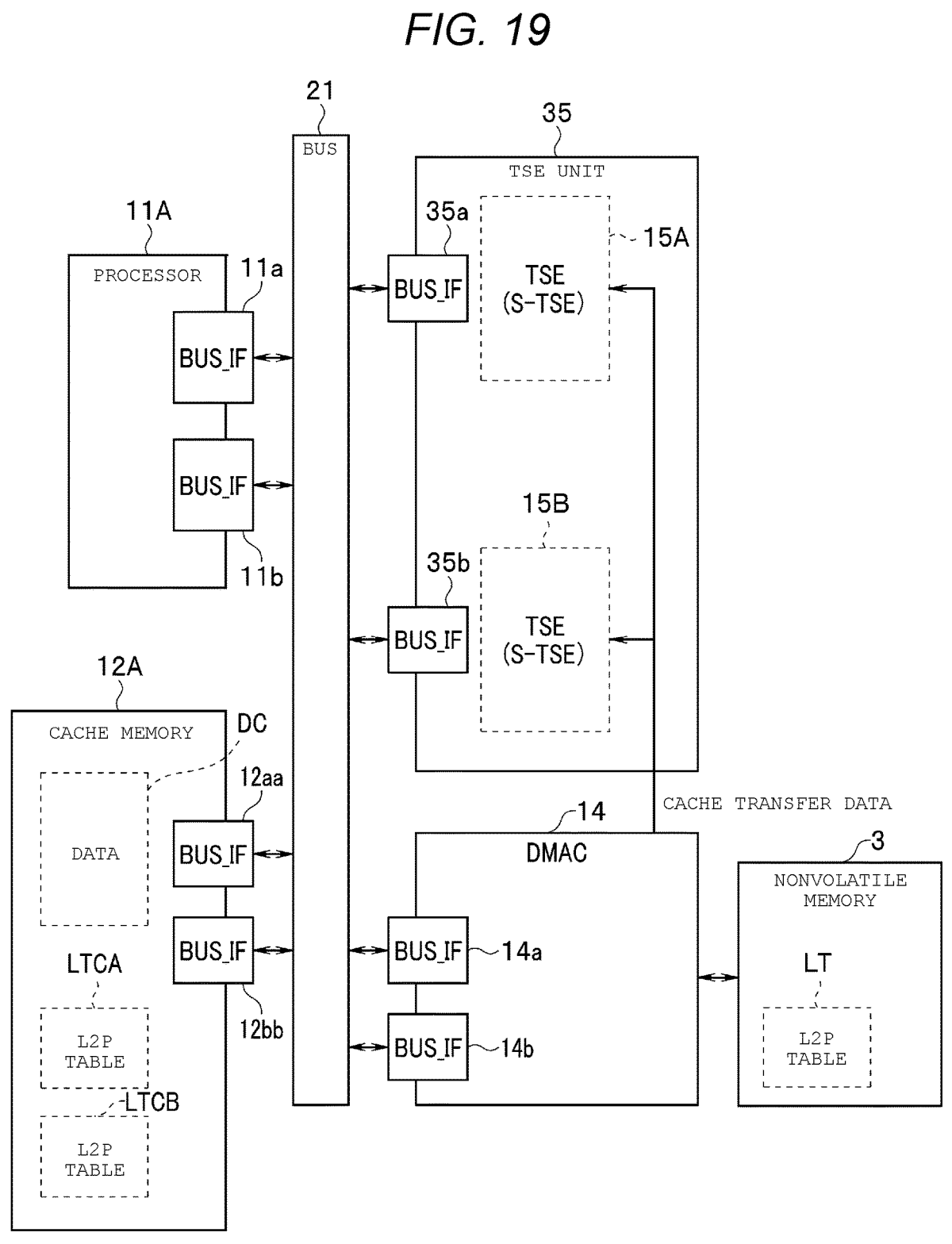

A seventh embodiment will be described. FIG. 19 is a block diagram illustrating the seventh embodiment. In FIG. 19, the same components as those in FIG. 1 are denoted by the same reference numerals, and the description thereof is omitted.

This embodiment has the bus 21 instead of the bus 13. The bus 21 includes buses of a plurality of paths.

In addition, the embodiment also includes a TSE unit 35. The TSE unit 35 includes two TSEs of a TSE 15A and a TSE 15B, configured similarly to the TSE 15. Each of the TSE 15A and the TSE 15B has both the function of the TSE 15 and the function of the S_TSE 16. The TSE unit 35 includes a BUS_IF 35*a* and a BUS_IF 35*b* to allow the TSE 15A and the TSE 15B to communicate with the plurality of buses simultaneously.

In addition, this embodiment includes a processor 11A instead of the processor 11. The processor 11A includes a BUS_IF 11*b* as well as the BUS_IF 11*a* to allow simultaneous communication with the plurality of buses.

Further, this embodiment includes a cache memory 12A instead of the cache memory 12. The cache memory 12A stores two L2P table caches LTCA and LTCB instead of the L2P table cache LTC. The cache memory 12A includes BUS_IFs 12*aa* and 12*bb* for simultaneously accessing these L2P table caches LTCA and LTCB. Different table data are stored in the L2P table cache LTCA and the L2P table cache LTCB. It is noted that the same table data or partially the same table data may be stored in the L2P table cache LTCA and the L2P table cache LTCB.

Other configurations are the same as those of the first embodiment illustrated in FIG. 1.

It is noted that each of the TSEs 15A and 15B can be relatively easily implemented by adding, to the TSE 15, a function of switching between data read from the cache memory 12A and data read and transferred from the nonvolatile memory 3 by the DMAC 14, for data to be searched by the comparison circuit 16C. Therefore, this embodiment can utilize existing design/verification assets and reduce development costs.

Figure 20:
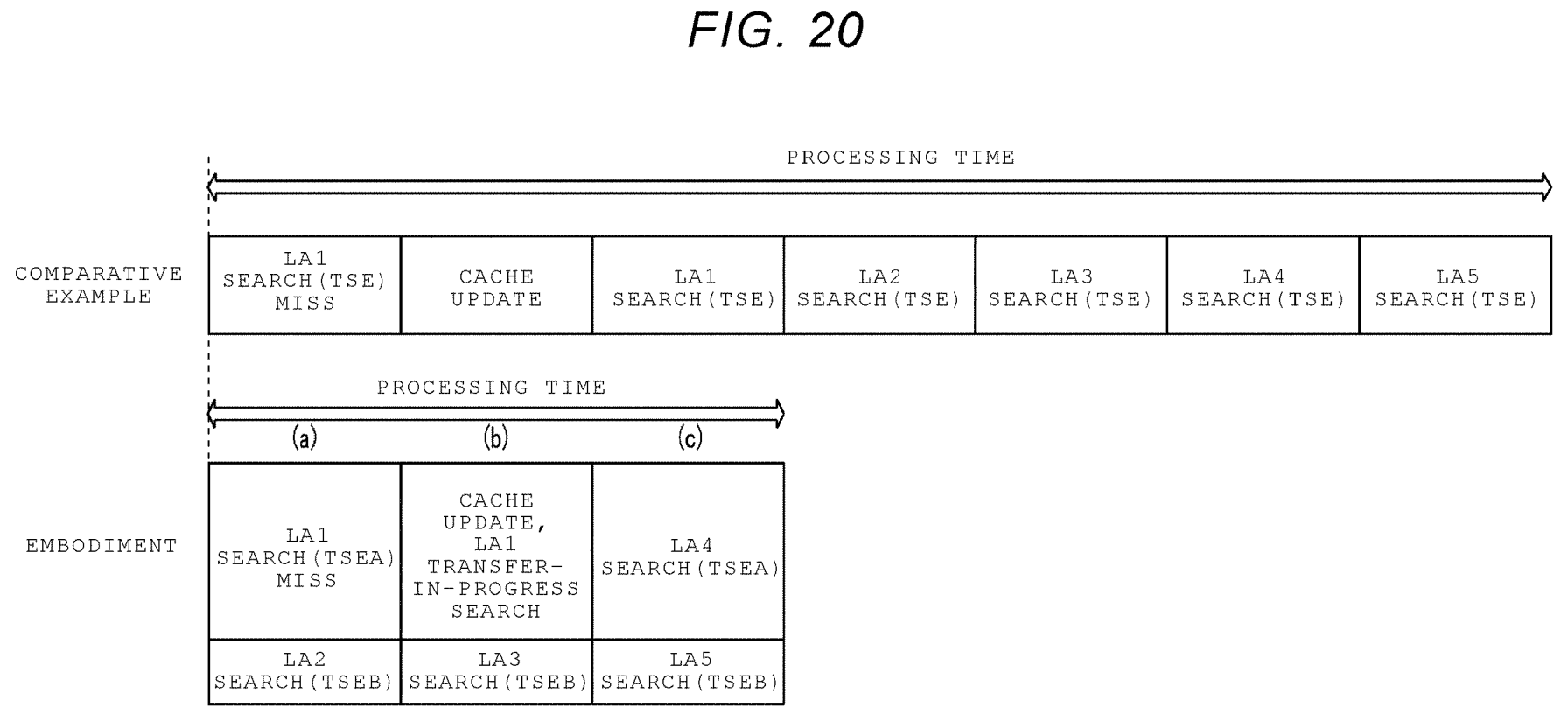

Next, the operations of the embodiment configured as described above will be described with reference to FIG. 20. FIG. 20 is a timing chart illustrating the operations of the seventh embodiment.

FIG. 20 illustrates the processing time on the horizontal axis. The upper part of FIG. 20 illustrates search timing in a comparative example. The lower part of FIG. 20 illustrates search timing in this embodiment. The comparative example does not have the two TSEs 15A and 15B, and performs the operation illustrated in FIG. 2, that is, search by the TSE 15.

In the operations of the comparative example illustrated in the upper part of FIG. 20, it is assumed that the entry for the logical address LA1 is not stored and the entries for logical addresses LA2 to LA5 are stored in the cache memory 12.

In the comparative example, as illustrated in the upper part of FIG. 20, the cache miss is detected by performing the search for the logical address LA1. When the processor 11 receives an interrupt of the cache miss, the processor 11 instructs the DMAC 14 to transfer the L2P table LT. The DMAC 14 reads the L2P table LT from the nonvolatile memory 3 and transfers the L2P table LT to the cache memory 12 to update the cache memory 12. After that, the search for the logical address LA1 is performed again. After that, the searches for the logical addresses LA2 to LA5 are sequentially performed.

In the operations of this embodiment illustrated in the lower part of FIG. 20, it is assumed that the cache data for the logical address LA1 is not stored in the cache memory 12A, the entry corresponding to the logical address LA4 is stored in the L2P table cache LTCA, and the entries corresponding to the logical addresses LA2, LA3, and LA5 are stored in the L2P table cache LTCB.

The processor 11A performs searches using the two engines of the TSE 15A and the TSE 15B. That is, according to the instruction of the processor 11A, the TSE 15A searches for the logical address LA1 and the TSE 15B searches for the logical address LA2, for example, during the processing period (a) illustrated in the lower part of FIG. 20.

The search for the logical address LA1 by TSE 15A results in the cache miss. On the other hand, the search for the logical address LA2 by TSE 15B results in the cache hit. An interrupt of the cache miss from the TSE 15A and an interrupt of the cache hit from the TSE 15B are transmitted to the processor 11A. The processor 11A acquires a physical address corresponding to the logical address LA2 from the TSE 15B as a search result.

In the next processing period (b), the processor 11 instructs the DMAC 14 to transfer data including the entry corresponding to the logical address LA1 that has caused the cache miss. The TSE 15A, which has detected the cache miss, in parallel with the transfer of the L2P table LT corresponding to the logical address LA1, performs the search (transfer-in-progress search) for the logical address LA1 (processing period (b)). In addition, the TSE 15B, which has not detected the cache miss, continues the search during the processing period (b) and searches the L2P table cache LTCB for the logical address LA3. Thus, in the processing period (b), physical addresses corresponding to the logical addresses LA1 and LA3 are obtained as search results.

At the next processing period (c), the TSE 15A performs the search for the logical address LA4, and the TSE 15B performs the search for the logical address LA5. Thus, at the processing period (c), physical addresses corresponding to the logical addresses LA4 and LA5 are obtained. Thus, in this embodiment, the search for the physical addresses corresponding to the logical addresses LA1 to LA5 can be completed in three processing periods.

As described above, in this embodiment, the same effects as those of the above-described embodiments can be obtained, and the searching speed can be remarkably improved by implementing the two TSEs each having a transfer-in-progress search function.

Embodiments and modification examples are not limited to the forms described above, and various modification examples are possible to be implemented. In addition, the above embodiments and modification examples can be combined as much as possible.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:

a nonvolatile memory; and a memory controller including:

a bus, a cache memory connected to the bus, a direct memory access controller connected to the bus, a first search circuit connected to the bus, a second search circuit connected to the bus, and a transfer control circuit connected to the bus, wherein the first search circuit is configured to search a first cache target data stored in the cache memory, in response to the first search circuit detecting a cache miss, the direct memory access controller is configured to transfer a second cache target data from in the nonvolatile memory to the cache memory, the second cache target data including a plurality of entries, the second search circuit is configured to, in parallel with the cache memory being write-accessed to write the second cache target data including a first target entry of the plurality of entries being transferred from the nonvolatile memory to the cache memory by the direct memory access controller, search the second cache target data including the first target entry, and the transfer control circuit is configured to:

assign, in response to the second search circuit detecting a search hit, to the transfer control circuit and the second search circuit, a bus right which has been assigned at least to the cache memory for the transfer of the second cache target data to the cache memory, the search hit indicating that the first target entry has been detected in the second cache target data that is being transferred to the cache memory by the direct memory access controller; and obtain, by using the assigned bus right, a search result from the second search circuit via the bus.

2. The memory system according to claim 1, wherein the second search circuit is included in the direct memory access controller.

3. The memory system according to claim 1, wherein the transfer control circuit is further configured to, in the transfer of the second cache target data to the cache memory, store a portion of the second cache target data into the cache memory and not to store other portion of the second cache target data into the cache memory.

4. The memory system according to claim 1, wherein the cache memory includes a temporary memory, and the transfer control circuit is further configured to, in the transfer of the second cache target data to the cache memory, transfer the second cache target data to the temporary memory; and according to the search result obtained from the second search circuit, determine whether to store the second cache target data stored in the temporary memory into the cache memory as cache data.

5. The memory system according to claim 1, wherein the bus includes buses of a plurality of paths, and the transfer control circuit is further configured to assign the bus right so that (A) searching by the first search circuit for a second target entry of a plurality of entries of a third cache target data stored in the cache memory and (B) searching by the second search circuit for the first target entry of the second cache target data that is being transferred are performed in parallel.

6. The memory system according to claim 1, wherein the second search circuit includes a plurality of third search circuits configured to perform parallel search on the second cache target data that is being transferred based on a plurality of search conditions.

7. The memory system according to claim 1, wherein the transfer control circuit is further configured to access the nonvolatile memory based on a physical address included in the search result, in response to the search hit being notified from the second search circuit.

8. The memory system according to claim 1, wherein the transfer control circuit is further configured to retransmit the second cache target data from the nonvolatile memory after a search miss is notified from the second search circuit, the search miss indicating that the first target entry has not been detected in the second cache target data that is being transferred to the cache memory by the direct memory access controller.

9. The memory system according to claim 1, wherein the bus includes buses of a plurality of paths, each of the first search circuit and the second search circuit has:

a function of searching cache data stored in the cache memory, and a function of searching the second cache target data that is being transferred by the direct memory access controller, and the transfer control circuit is configured to assign the bus right so that (A) searching by one of the first and second search circuits the cache data stored in the cache memory and (B) searching by the other one of the first and second search circuits the second cache target data that is being transferred are performed in parallel.

10. A method of operating a controller, the controller including a bus, a cache memory connected to the bus, a direct memory access controller connected to the bus, a first search circuit connected to the bus, a second search circuit connected to the bus, and a transfer control circuit connected to the bus, the method comprising:

by the first search circuit, searching a first cache target data stored in the cache memory;

in response to the first search circuit detecting a cache miss, by the direct memory access controller, transferring a second cache target data stored in the nonvolatile memory to the cache memory, the second cache target data including a plurality of entries, by the second search circuit, searching the second cache target data including a first target entry of the plurality of entries in parallel with the cache memory being write-accessed to write the second cache target data including the first target entry being transferred to the cache memory by the direct memory access controller;

by the transfer control circuit, assigning, in response to the second search circuit detecting a search hit, to the transfer control circuit and the second search circuit, a bus right which has been assigned at least to the cache memory for the transfer of the second cache target data to the cache memory, the search hit indicating that the first target entry has been detected in the second cache target data that is being transferred to the cache memory by the direct memory access controller; and by the transfer control circuit, obtaining, by using the assigned bus right, a search result from the second search circuit via the bus.

11. The method according to claim 10, wherein the second search circuit is included in the direct memory access controller.

12. The method according to claim 10, further comprising:

by the transfer control circuit, in the transfer of the second cache target data to the cache memory, storing a portion of the second cache target data into the cache memory and not storing other portion of the second cache target data into the cache memory.

13. The method according to claim 10, wherein the cache memory includes a temporary memory, and the method further comprises:

by the transfer control circuit, in the transfer of the second cache target data to the cache memory, transferring the second cache target data to the temporary memory; and according to the search result obtained from the second search circuit, determining whether to store the second cache target data stored in the temporary memory into the cache memory as cache data.

14. The method according to claim 10, wherein the bus includes buses of a plurality of paths, and the method further comprises:

by the transfer control circuit, assigning the bus right so that (A) searching by the first search circuit for a second target entry of a plurality of entries of a third cache target data stored in the cache memory and (B) searching by the second search circuit for the first target entry of the second cache target data that is being transferred are performed in parallel.

15. The method according to claim 10, wherein the second search circuit includes a plurality of third search circuits configured to perform parallel search on the second cache target data that is being transferred based on a plurality of search conditions.

16. The method according to claim 10, further comprising:

by the transfer control circuit, accessing the nonvolatile memory based on a physical address included in the search result, in response to the search hit being notified from the second search circuit.

17. The method according to claim 10, further comprising:

by the transfer control circuit, retransmitting the second cache target data from the nonvolatile memory after a search miss is notified from the second search circuit, the search miss indicating that the first target entry has not been detected in the second cache target data that is being transferred to the cache memory by the direct memory access controller.

18. The method according to claim 10, wherein the bus includes buses of a plurality of paths, each of the first search circuit and the second search circuit has:

a function of searching cache data stored in the cache memory, and a function of searching the second cache target data that is being transferred by the direct memory access controller, and the method further comprises:

by the transfer control circuit, assigning the bus right so that (A) searching by one of the first and second search circuits the cache data stored in the cache memory and (B) searching by the other one of the first and second search circuits the second cache target data that is being transferred are performed in parallel.

19. A memory system comprising:

a nonvolatile memory; and a memory controller including:

a cache memory, a direct memory access controller, and a search circuit, wherein the direct memory access controller is configured to transfer first cache target data from the nonvolatile memory to the cache memory, the first cache target data including a plurality of entries, the search circuit is configured to, in parallel with the cache memory being write-accessed to write the first cache target data including a first target entry of the plurality of entries being transferred from the nonvolatile memory to the cache memory by the direct memory access controller, search the first cache target data including the first target entry to detect the first target entry.

20. The memory system according to claim 19, wherein the memory controller further comprises:

a transfer control circuit configured to, in response to the search circuit detecting a search hit indicating that the first target entry has been detected in the first cache target data, suspend the transfer of the first cache target data by the direct memory access controller and obtain a search result from the search circuit.

21. The memory system according to claim 19, wherein the memory controller further comprises:

a transfer control circuit; and a bus connected to the cache memory, the direct memory access controller, the search circuit, and the transfer control circuit, and the transfer control circuit is configured to:

assign, to the cache memory and the direct memory access controller, a bus right which is a right to use the bus, for the transfer of the first cache target data to the cache memory, in response to the search circuit detecting a search hit indicating that the first target entry has been detected in the first cache target data, assign the bus right to the transfer control circuit and the search circuit, and obtain, by using the assigned bus right, a search result from the search circuit via the bus.

22. The memory system according to claim 21, wherein the direct memory access controller is configured to, during the bus right being assigned to the transfer control circuit and the search circuit, not to transfer the first cache target data from the nonvolatile memory to the cache memory.

23. The memory system according to claim 19, wherein the search circuit is configured to snoop the first cache target data being transferred to the cache memory by the direct memory access controller.

* * * * *